United States Patent
Chung et al.

(10) Patent No.: US 11,265,060 B2
(45) Date of Patent: Mar. 1, 2022

(54) METHOD FOR TRANSMITTING AND RECEIVING CHANNEL STATE INFORMATION IN WIRELESS COMMUNICATION SYSTEM AND DEVICE THEREFOR

(71) Applicant: LG ELECTRONICS INC., Seoul (KR)

(72) Inventors: Jaehoon Chung, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/963,205

(22) PCT Filed: Jan. 22, 2019

(86) PCT No.: PCT/KR2019/000913
§ 371 (c)(1),
(2) Date: Jul. 17, 2020

(87) PCT Pub. No.: WO2019/143226
PCT Pub. Date: Jul. 25, 2019

(65) Prior Publication Data
US 2021/0126692 A1    Apr. 29, 2021

Related U.S. Application Data

(60) Provisional application No. 62/636,163, filed on Feb. 28, 2018, provisional application No. 62/620,454, filed on Jan. 22, 2018.

(30) Foreign Application Priority Data

Dec. 20, 2018  (KR) .................. 10-2018-0166668

(51) Int. Cl.
*H04L 27/22* (2006.01)
*H04B 7/06* (2006.01)
(Continued)

(52) U.S. Cl.
CPC ......... *H04B 7/0663* (2013.01); *H04B 7/0417* (2013.01); *H04B 7/0452* (2013.01); *H04B 7/0626* (2013.01)

(58) Field of Classification Search
CPC ............... H04L 27/22; H04L 27/2332; H04L 2025/03783; H04L 25/0204;
(Continued)

(56) References Cited

U.S. PATENT DOCUMENTS

| | | | |
|---|---|---|---|
| 2015/0043444 A1* | 2/2015 | Wei | ...................... H04B 7/0413 370/329 |
| 2015/0222347 A1* | 8/2015 | Xia | ........................ H04B 7/024 370/329 |

(Continued)

FOREIGN PATENT DOCUMENTS

WO    2017/171305    10/2017

OTHER PUBLICATIONS

PCT International Application No. PCT/KR2019/000913, International Search Report dated May 7, 2019, 3 pages.
(Continued)

*Primary Examiner* — Khai Tran
(74) *Attorney, Agent, or Firm* — Lee Hong Degerman Kang Waimey

(57) ABSTRACT

Disclosed are a method for transmitting and receiving channel state information (CSI) in a wireless communication system and a device therefor. Particularly, a method by which a terminal reports channel state information in a wireless communication system can comprise the steps of: receiving, from a base station, configuration information
(Continued)

relating to the CSI report on a downlink channel; receiving, from the base station, at least one CSI-RS for the CSI report; outputting feedback information by means of the at least one CSI-RS; and reporting the CSI to the base station by using the outputted feedback information.

15 Claims, 20 Drawing Sheets

(51) Int. Cl.
*H04B 7/0417* (2017.01)
*H04B 7/0452* (2017.01)

(58) Field of Classification Search
CPC .. H04B 7/0617; H04B 7/0456; H04B 7/0695; H04B 7/0413; H04B 7/0417; H04W 24/10; H04W 24/02
USPC .......................................................... 375/329
See application file for complete search history.

(56) References Cited

U.S. PATENT DOCUMENTS

| | | |
|---|---|---|
| 2017/0134082 A1 | 5/2017 | Onggosanusi et al. |
| 2017/0302353 A1 | 10/2017 | Rahman et al. |
| 2018/0235008 A1* | 8/2018 | Park .......................... H04B 7/06 |

OTHER PUBLICATIONS

ZTE, "Overhead reduction for Type II CSI," 3GPP TSG RAN WG1 Meeting #90, R1-1712295, Prague, Czechia, Aug. 21-25, 2017, 6 pages.
Ericsson, "Type II CSI for beamformed CSI-RS and hybrid operation," 3GPP TSG-RAN WG1 Meeting #88bis, R1-1705928, Spokane, U.S., Apr. 3-7, 2017, 8 pages.

* cited by examiner

【Figure 1】
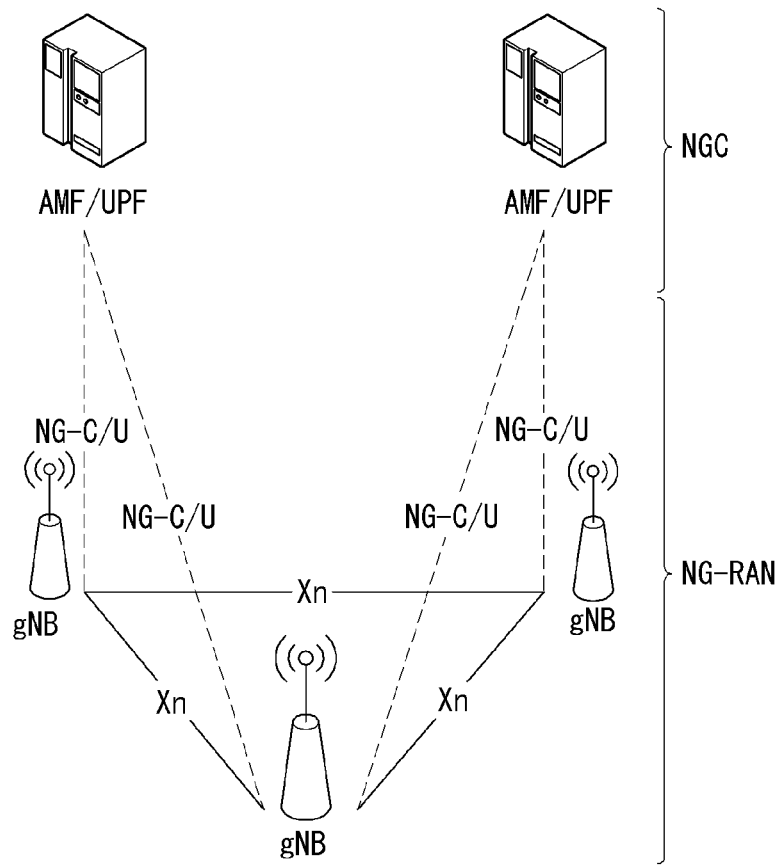
【Figure 2】
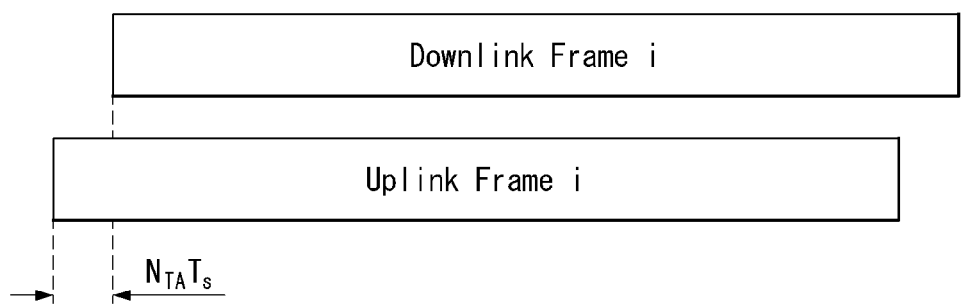

[Figure 3]
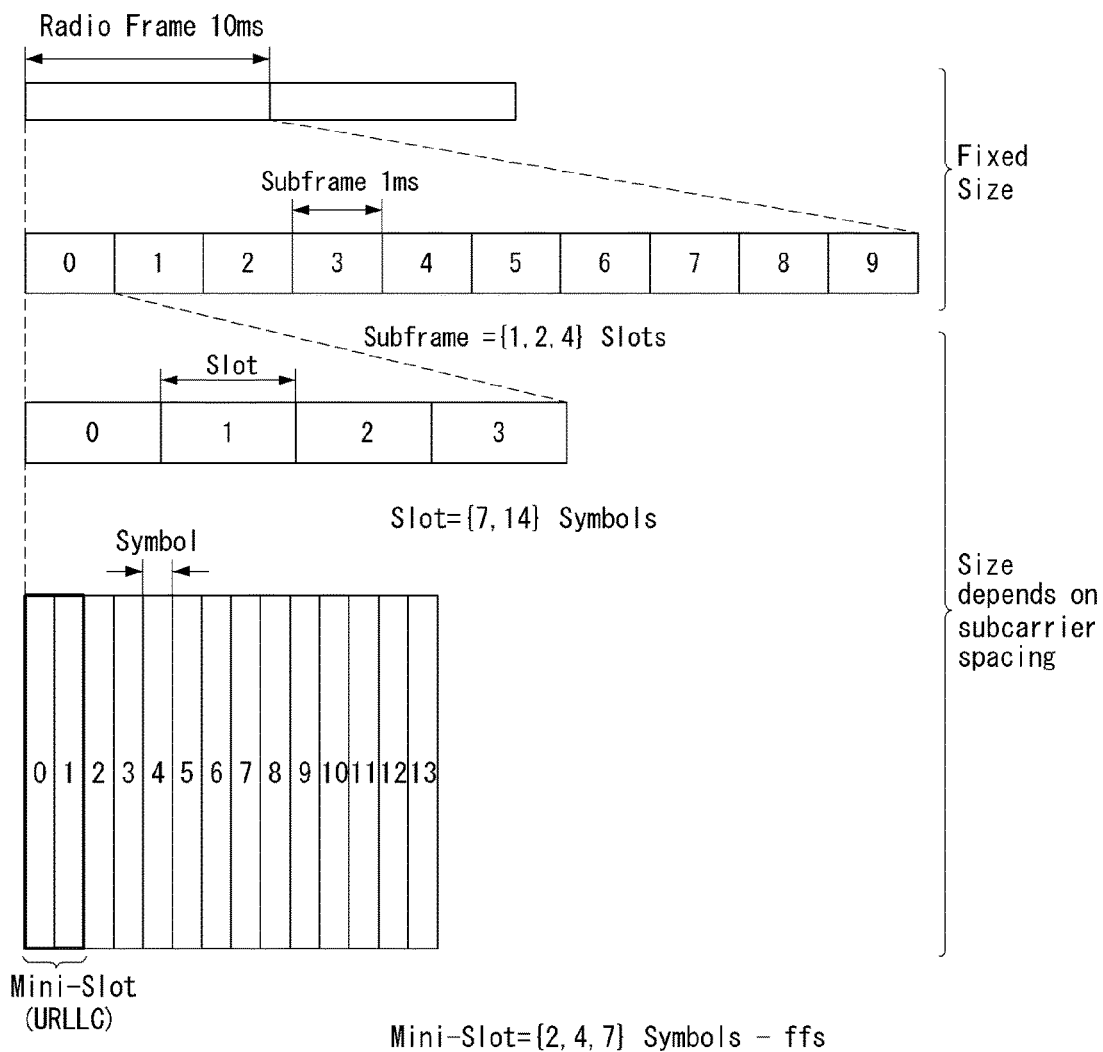

【Figure 4】
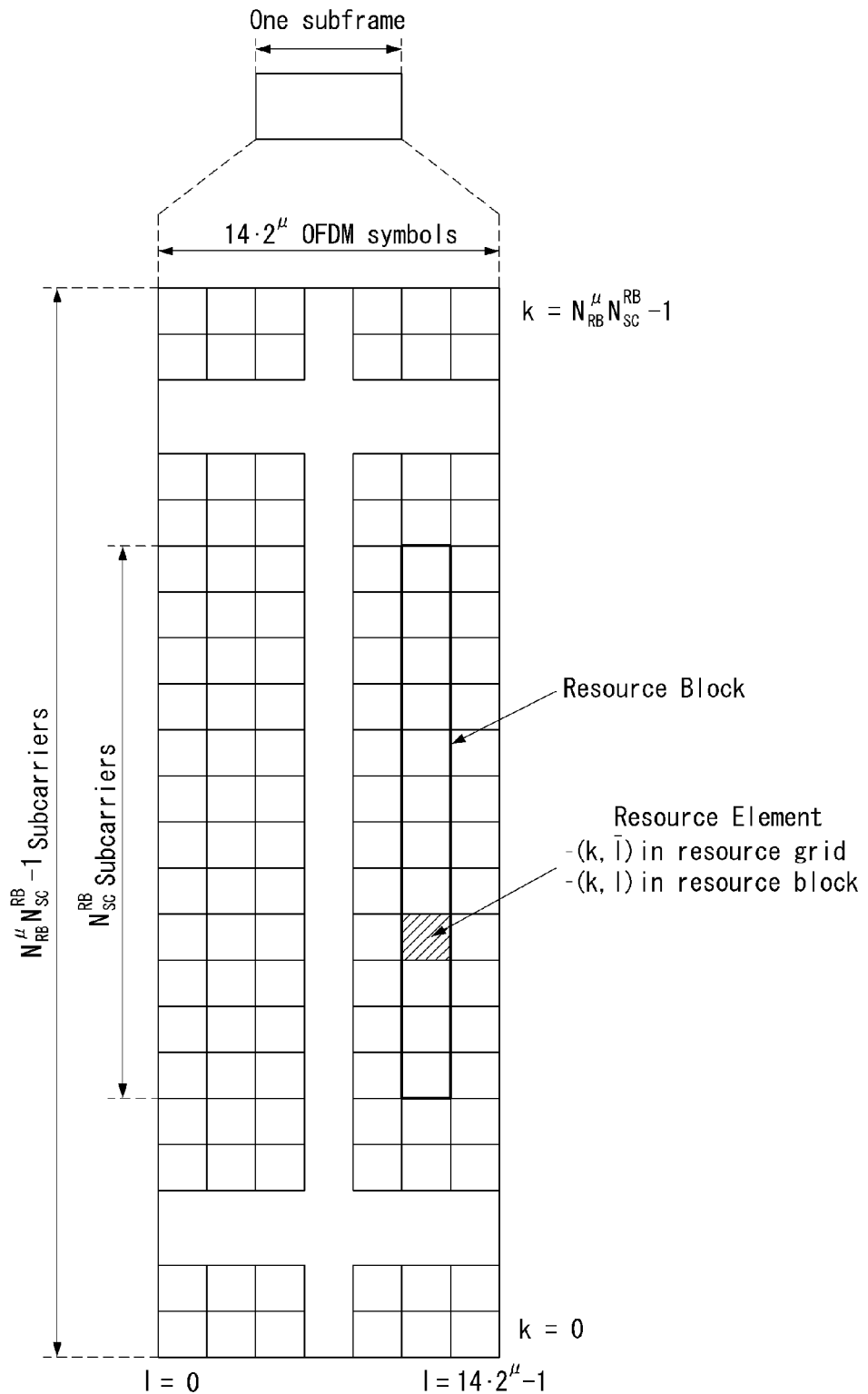

【Figure 5】
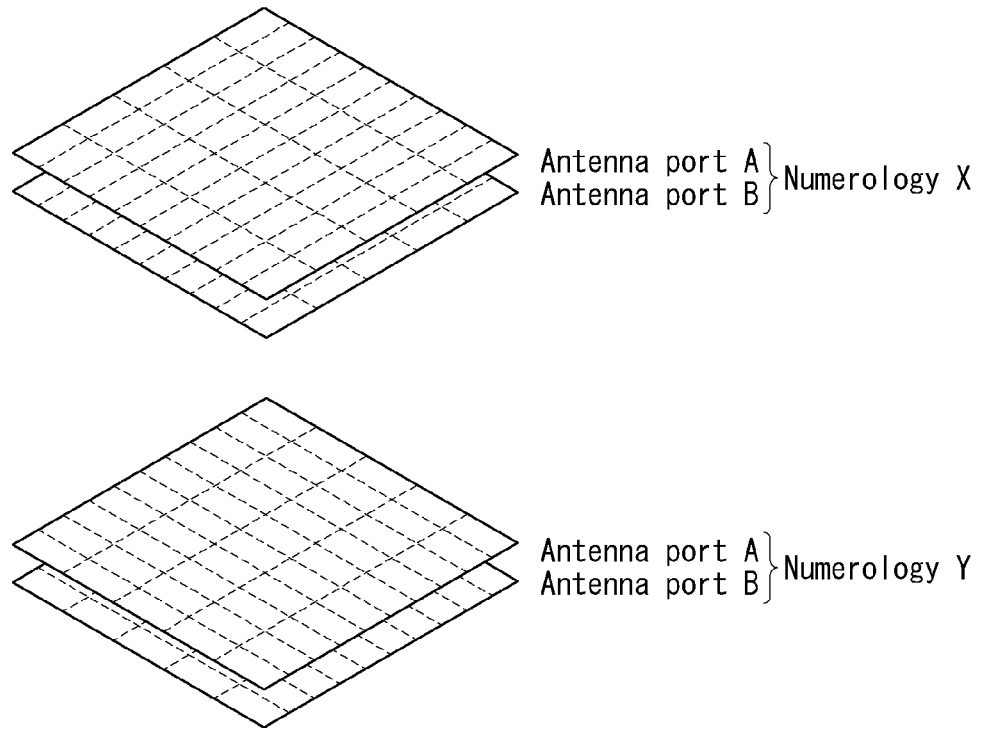
【Figure 6】
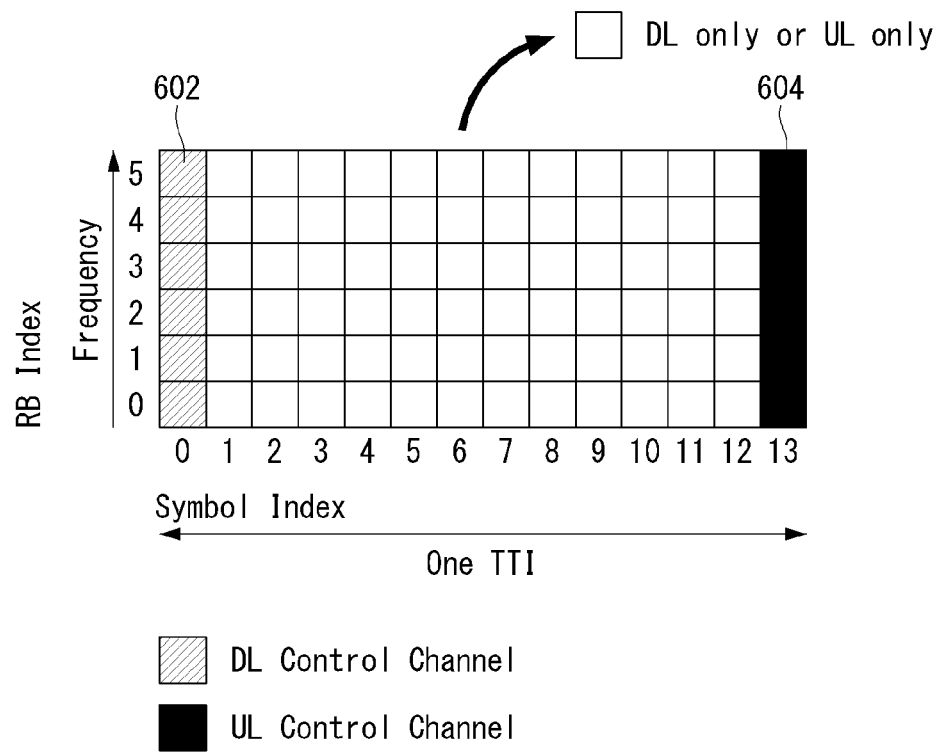

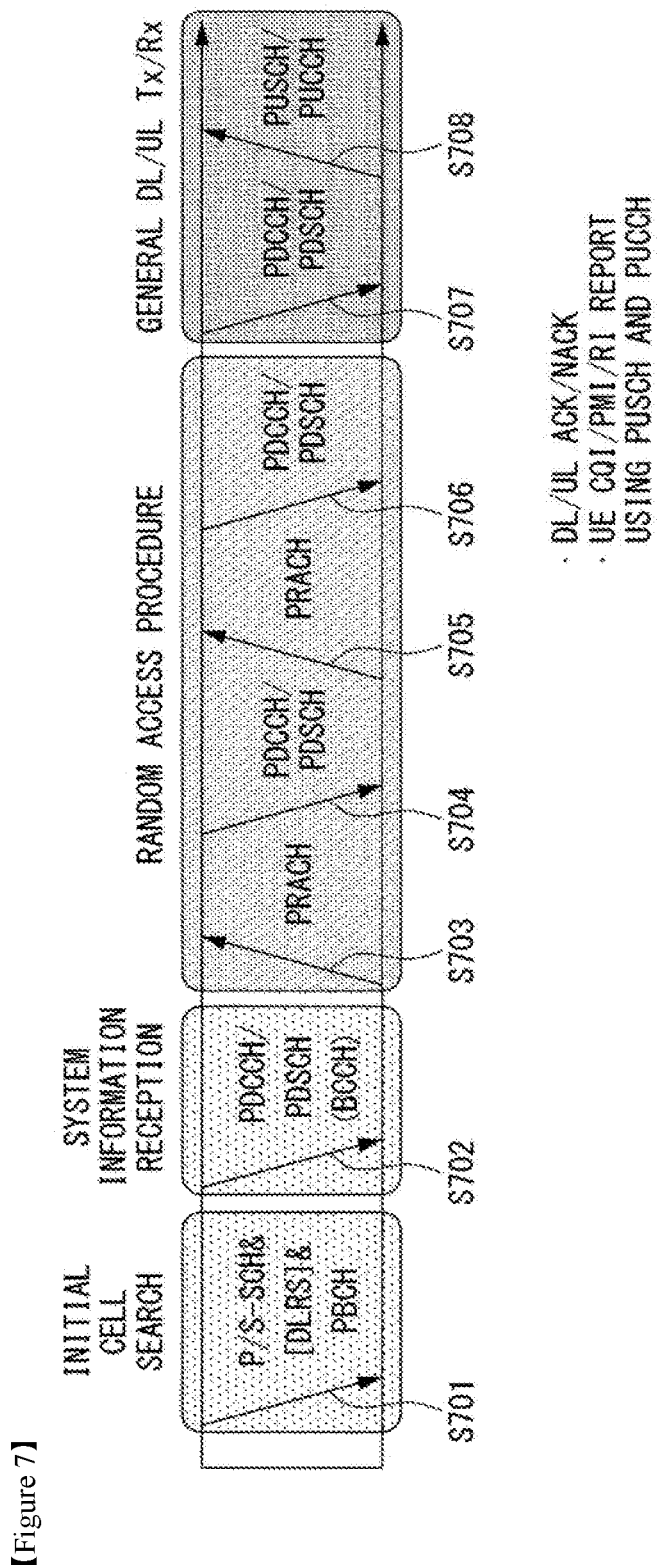

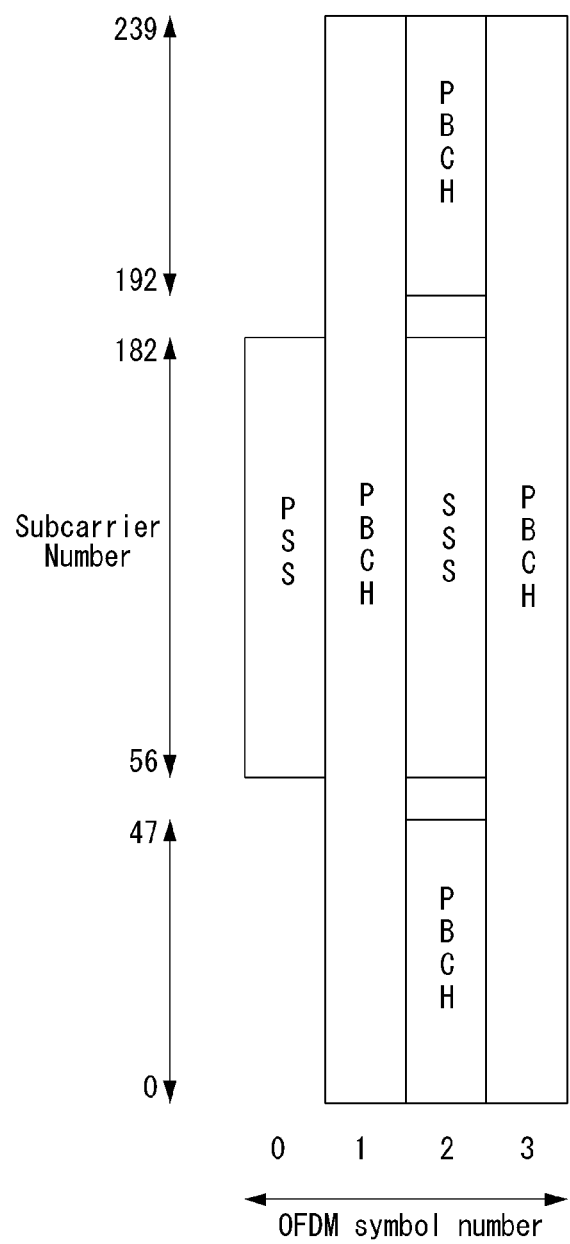
[Figure 8]

[Figure 9]
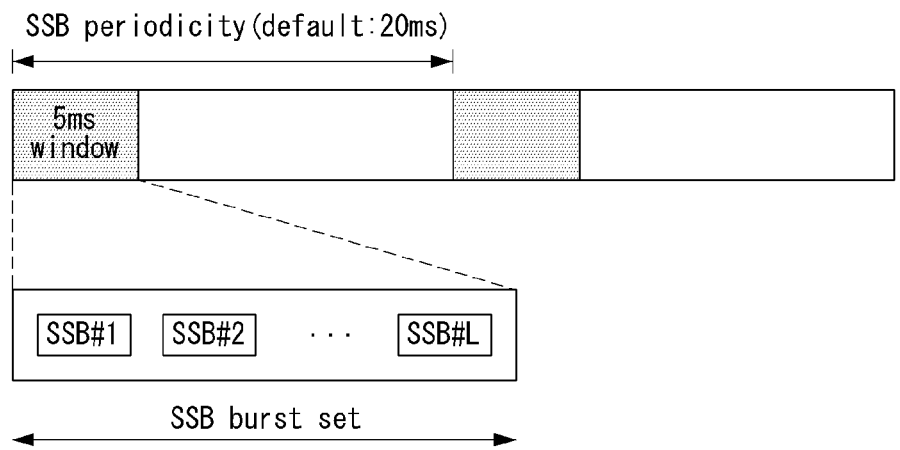
[Figure 10]
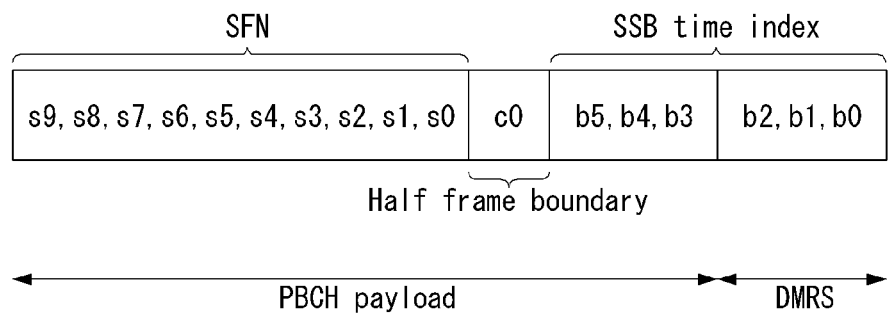

【Figure 11】
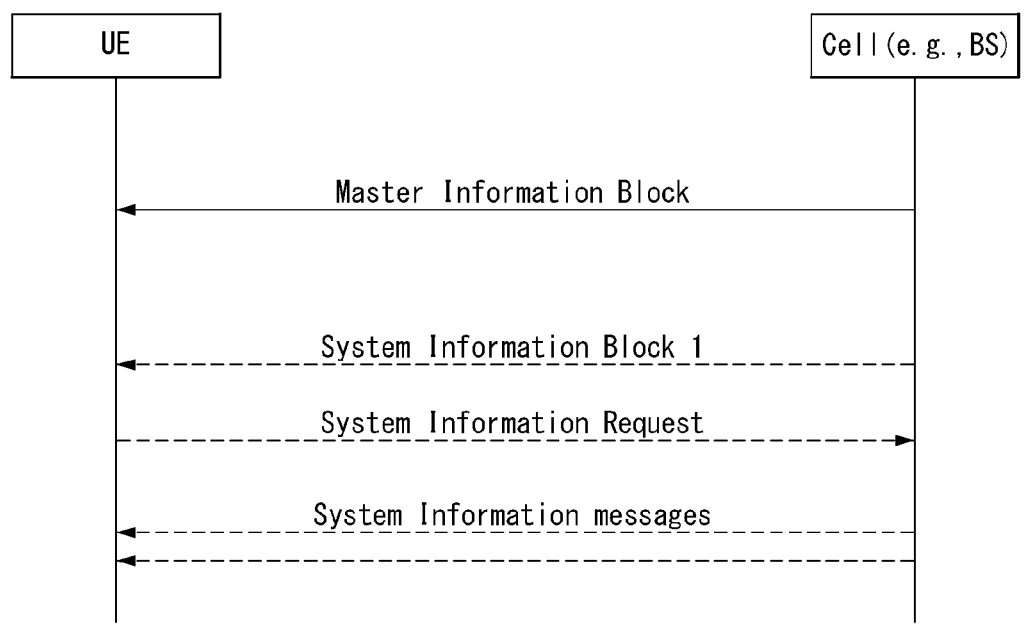

【Figure 12】
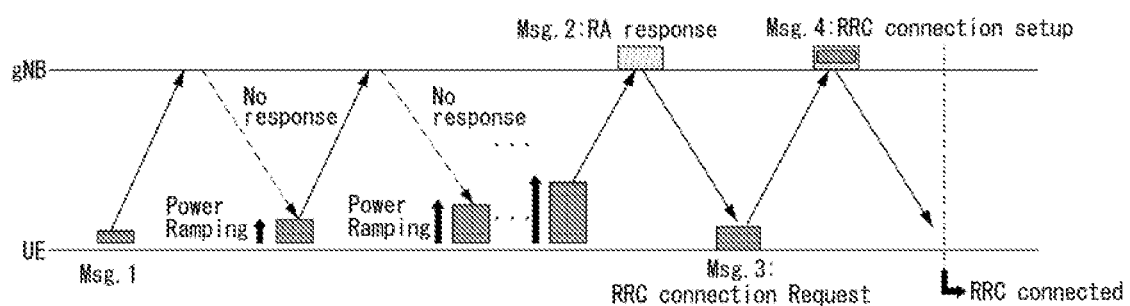
【Figure 13】
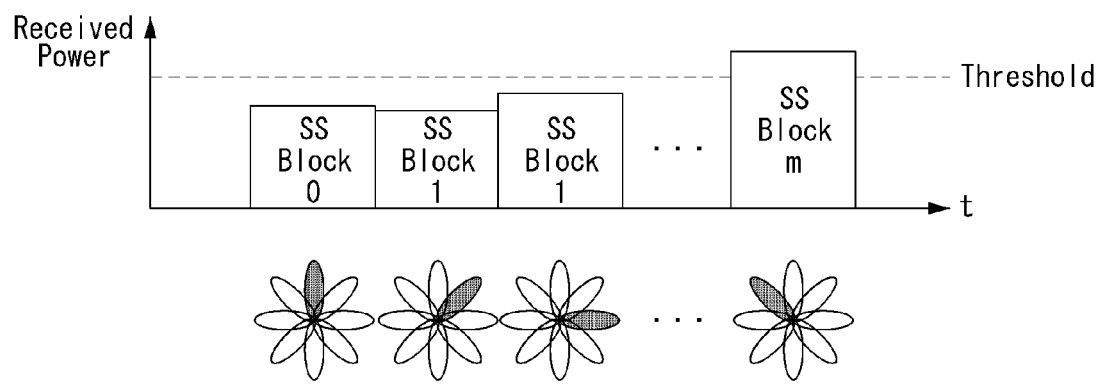

【Figure 14】
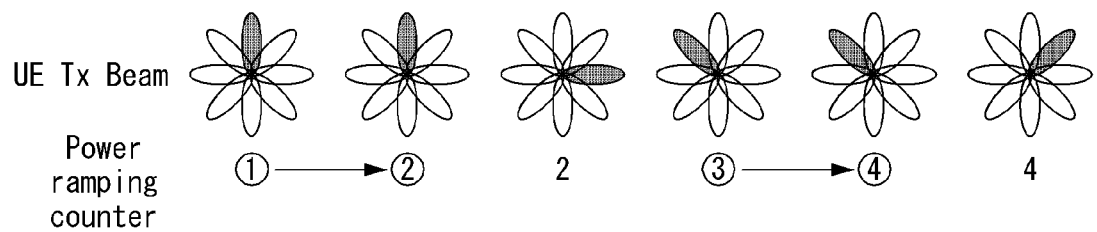
【Figure 15】
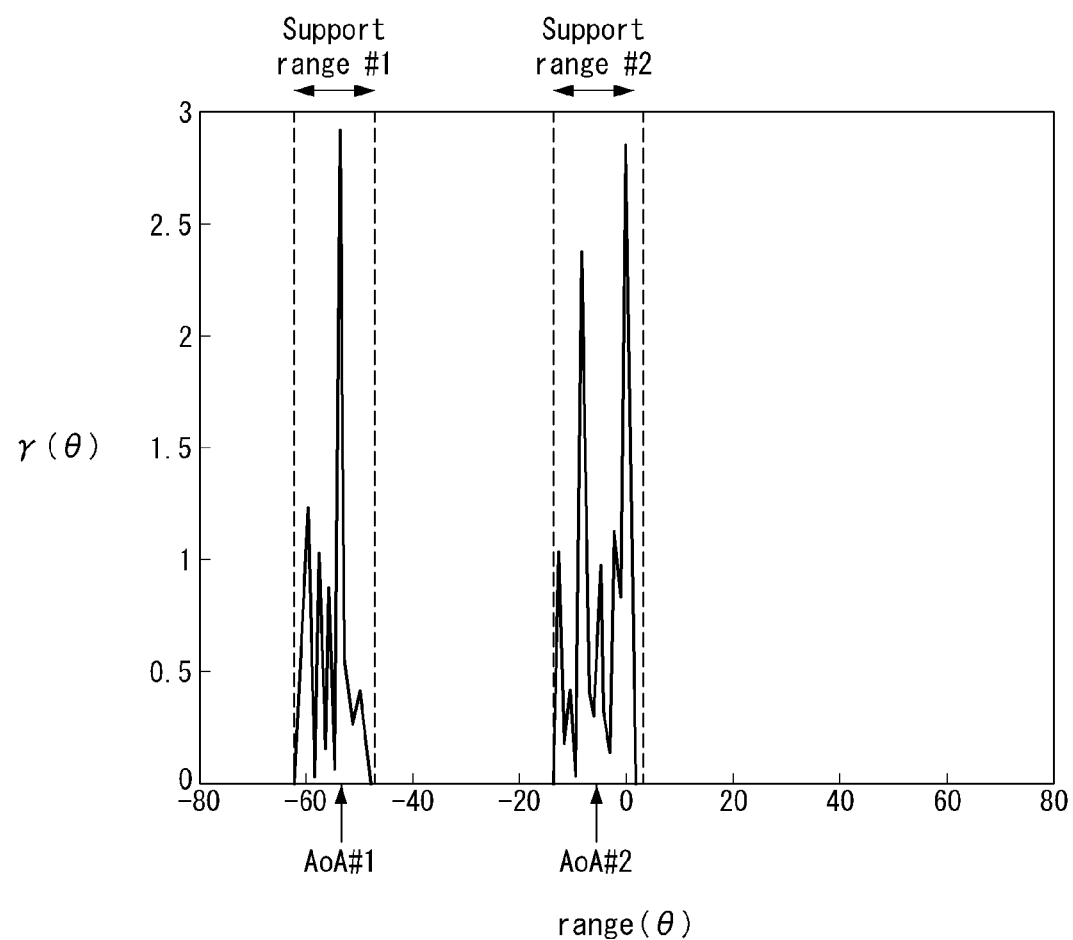

[Figure 16]
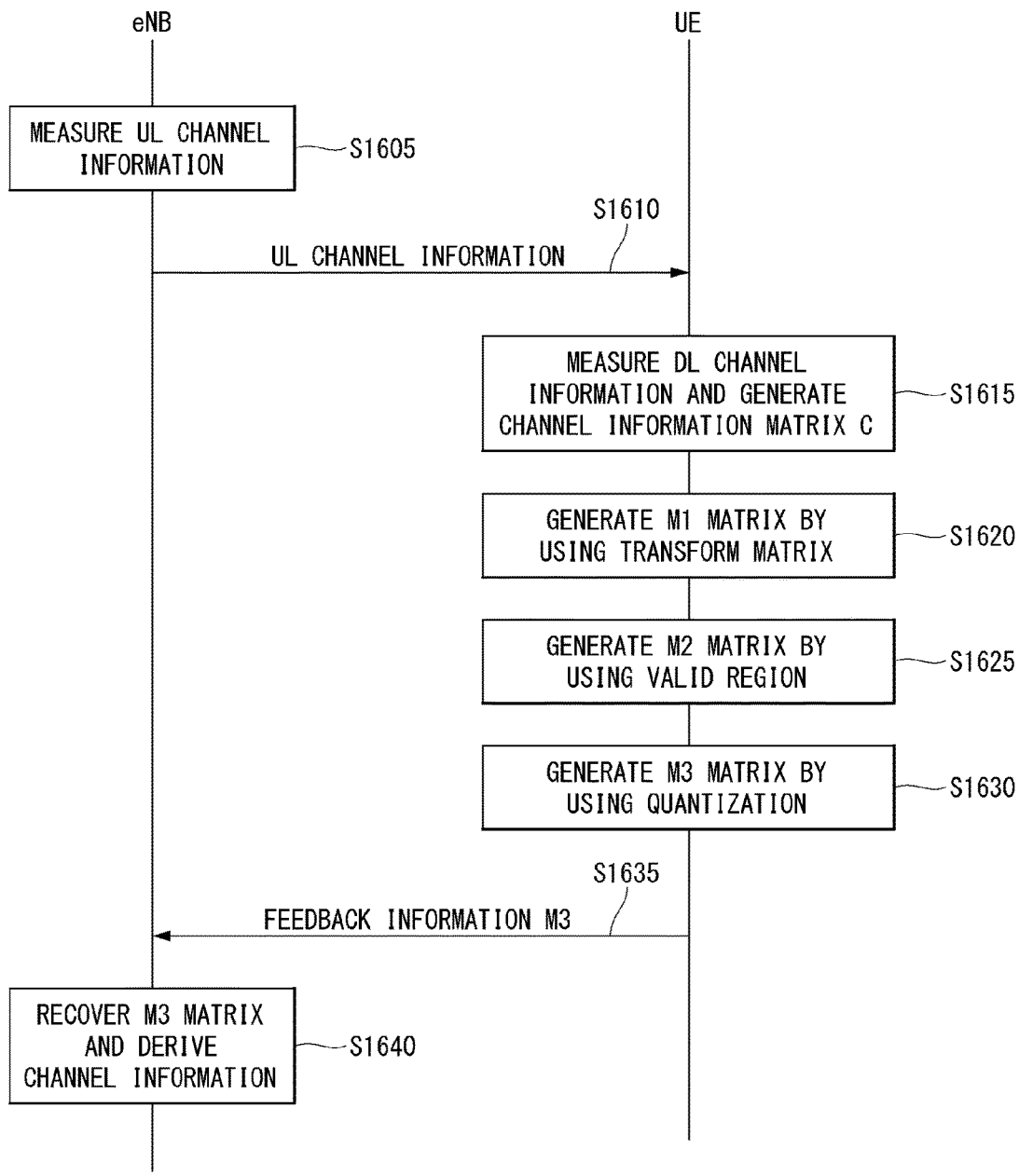

[Figure 17]
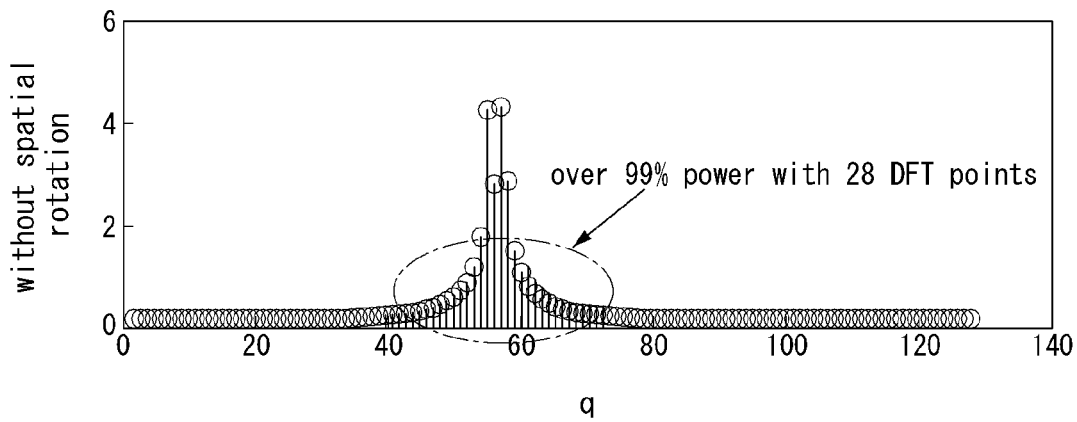
[Figure 18]
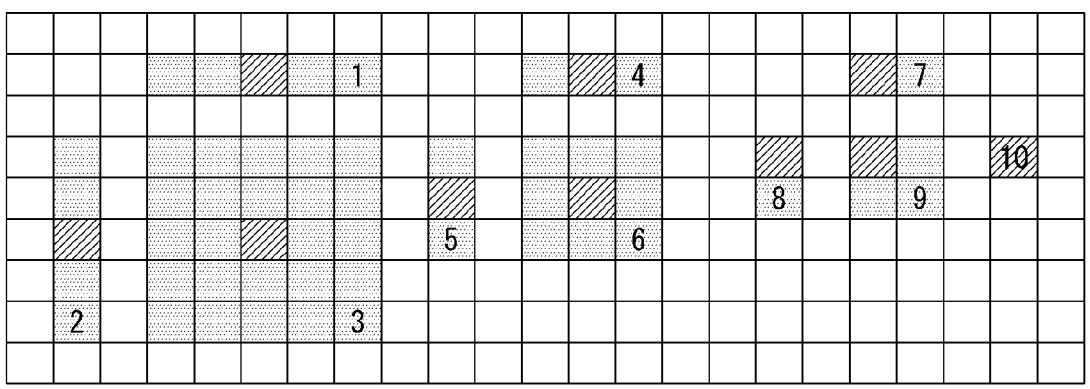

[Figure 19]
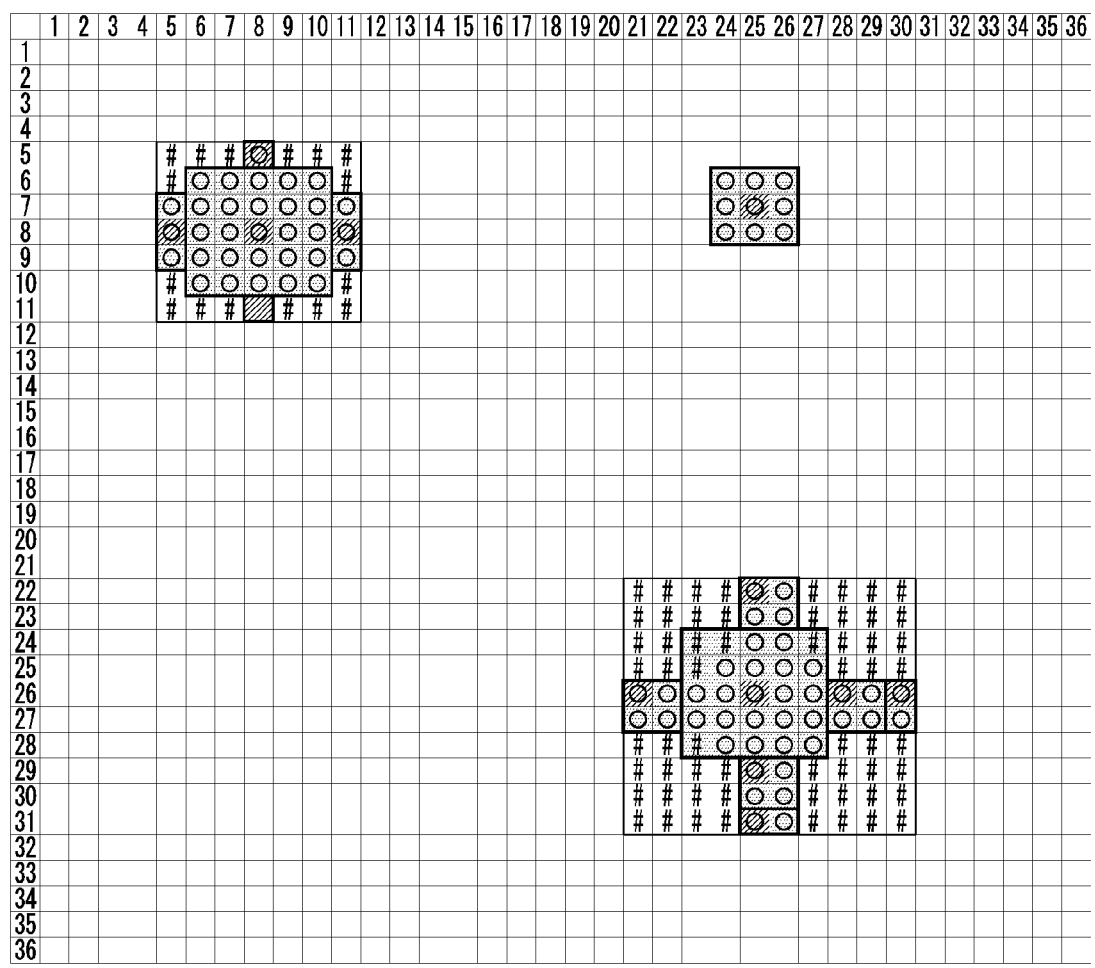

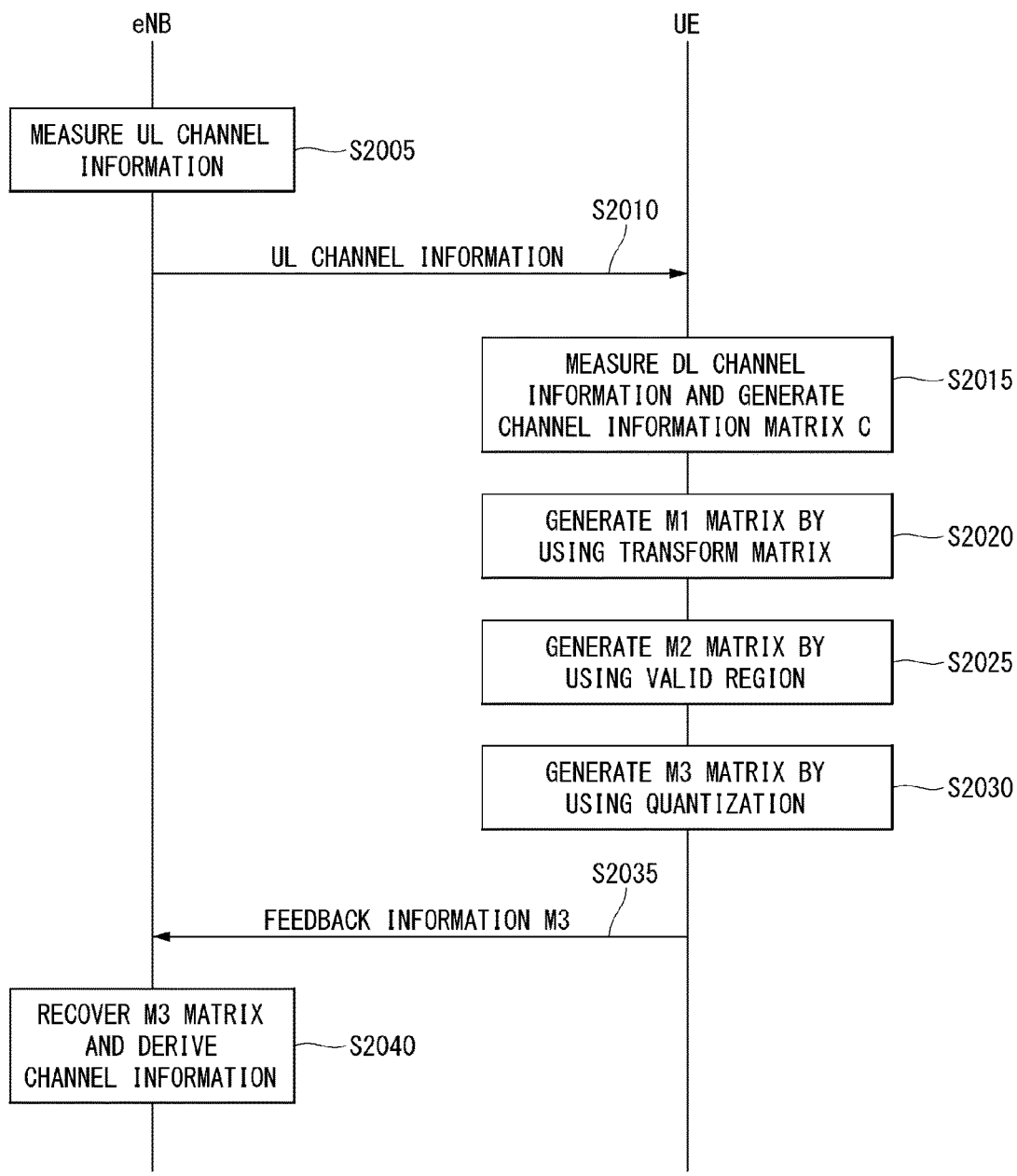
[Figure 20]

[Figure 21]
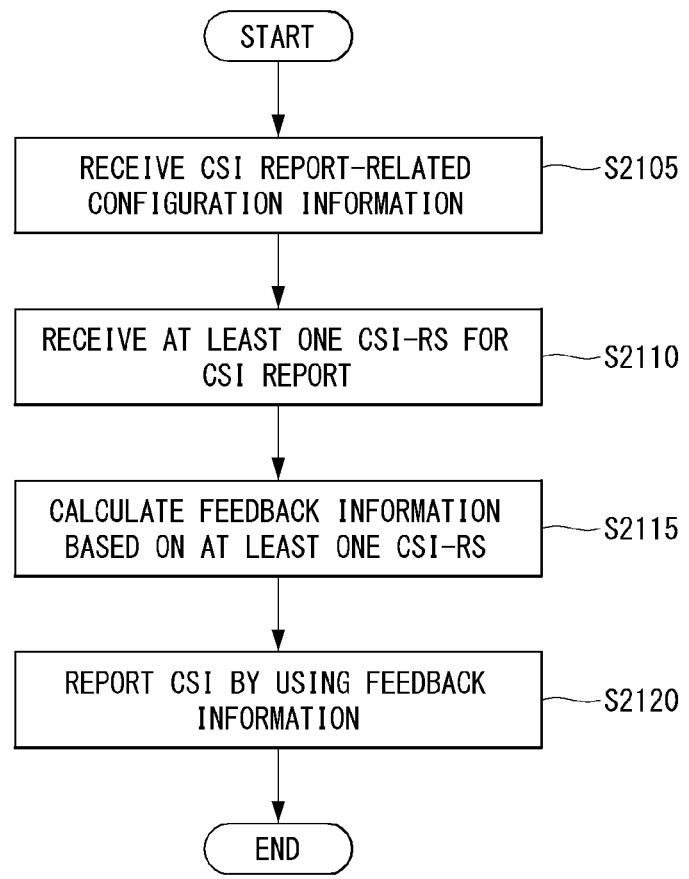

[Figure 22]
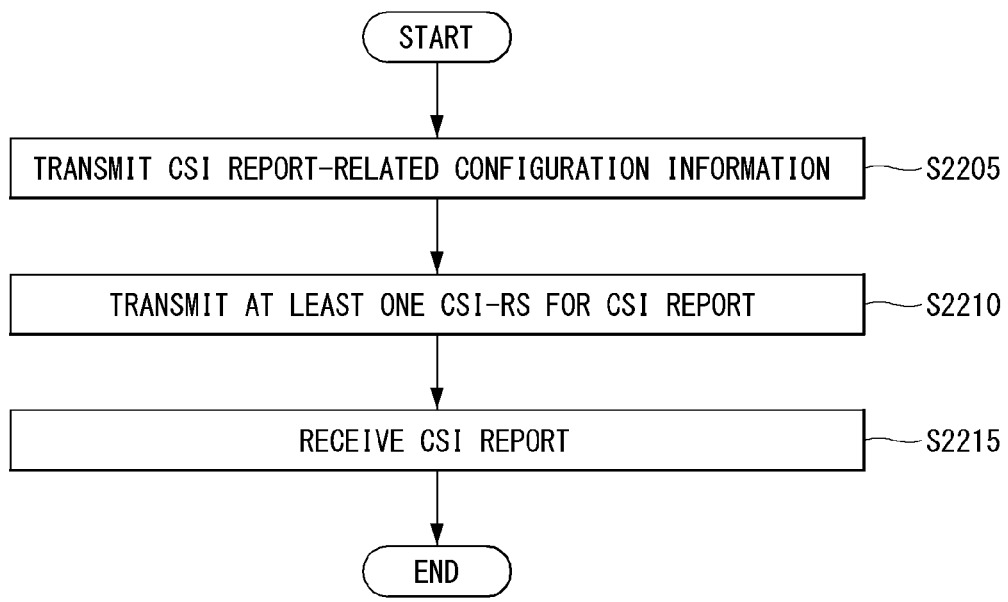

[Figure 23]
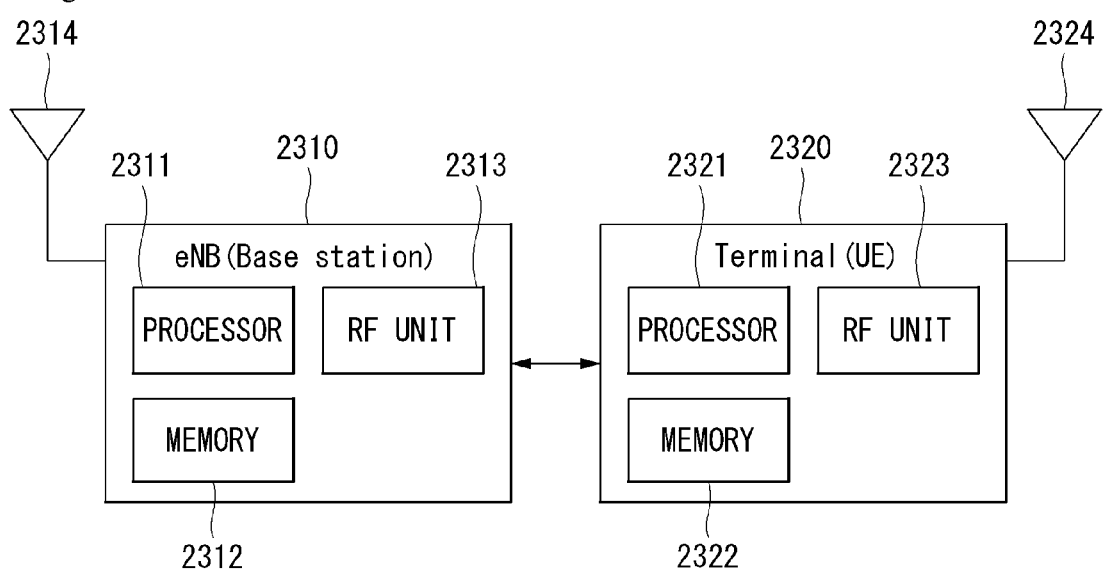

【Figure 24】
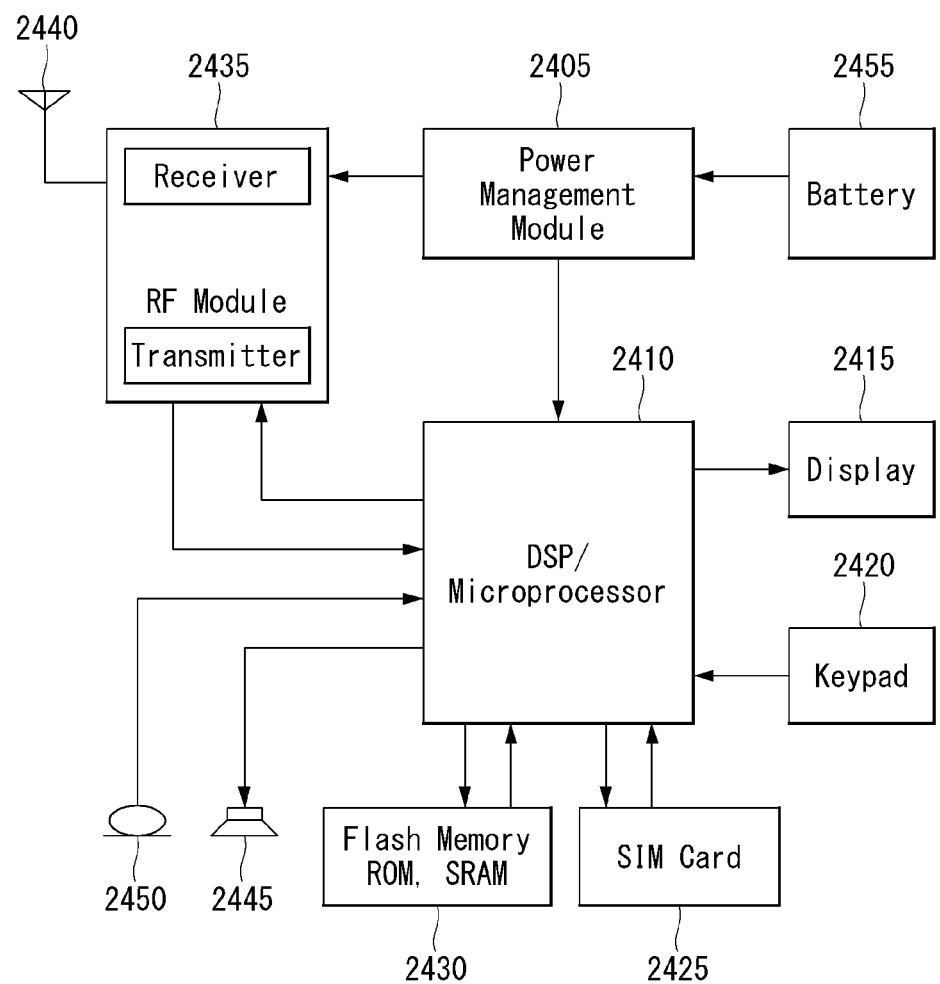

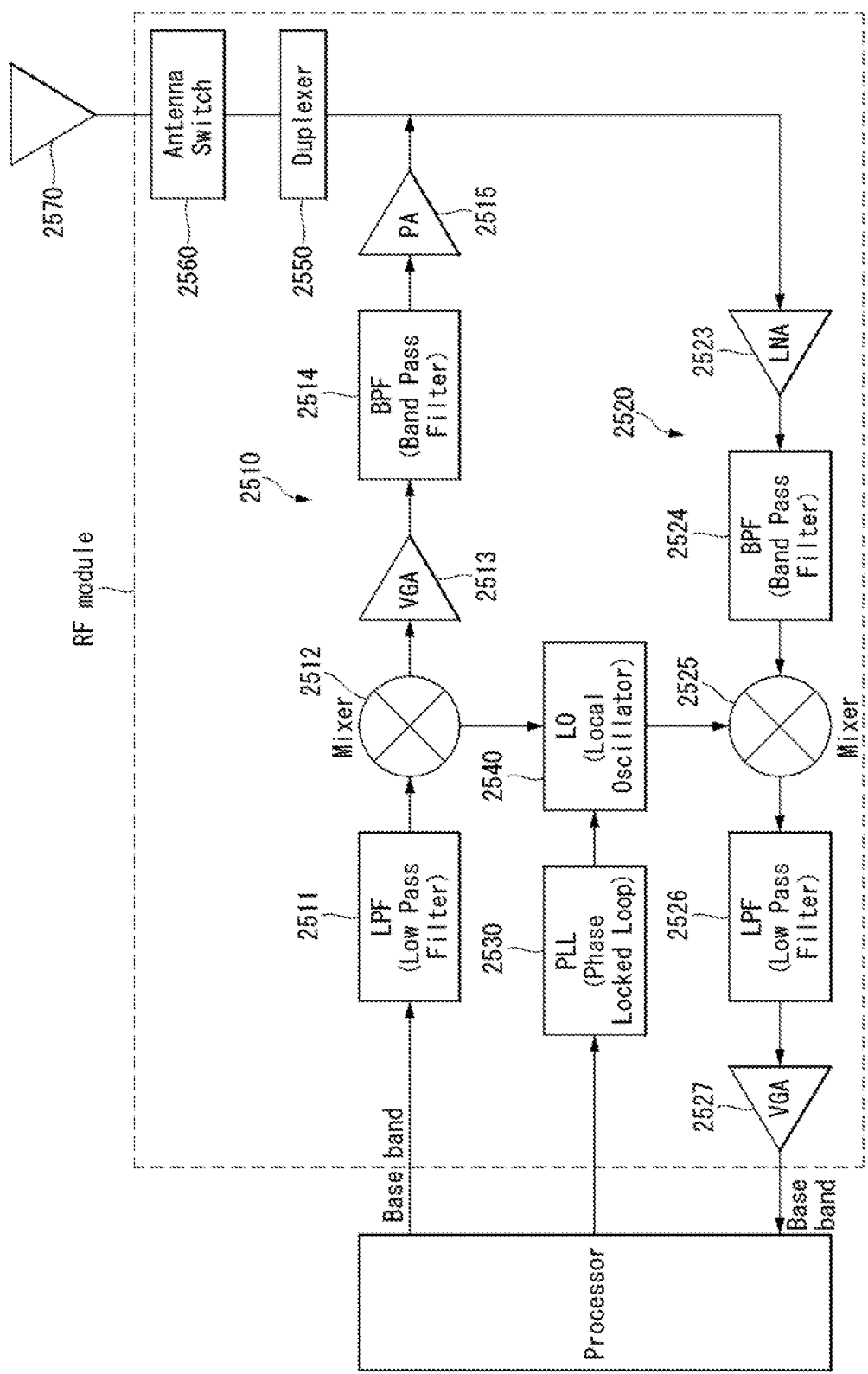
[Figure 25]

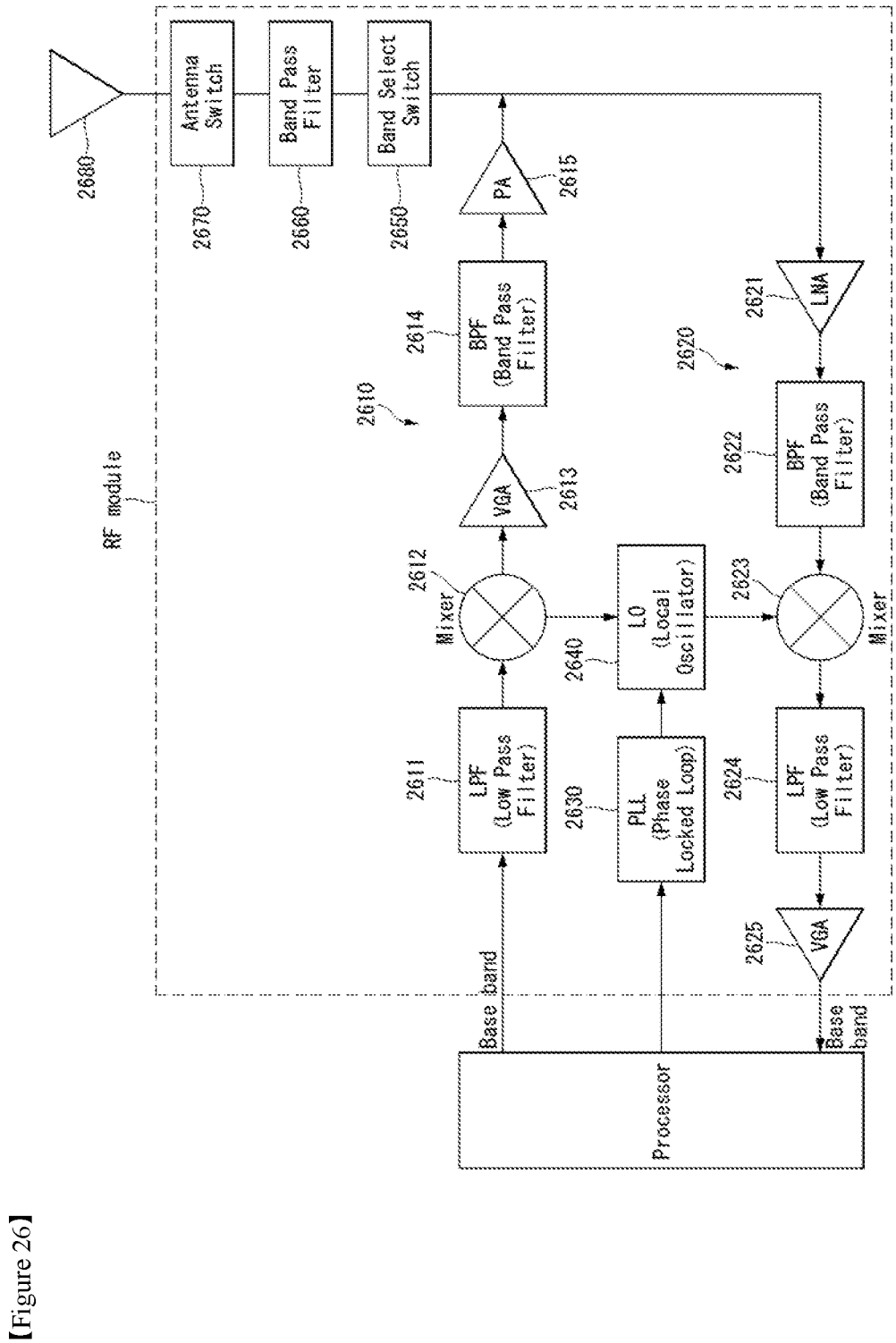
[Figure 26]

METHOD FOR TRANSMITTING AND RECEIVING CHANNEL STATE INFORMATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/000913, filed on Jan. 22, 2019, which claims the benefit of U.S. Provisional Application No. 62/620,454, filed on Jan. 22, 2018, and 62/636,163, filed Feb. 28, 2018, and also claims the benefit of earlier filing date and right of priority to Korean Application No. 10-2018-0166668, filed on Dec. 20, 2018, the contents of which are all hereby incorporated by reference herein in their entirety.

TECHNICAL FIELD

The present disclosure relates to a wireless communication system, and more particularly, to a method for transmitting and receiving channel state information and a device supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure proposes a method for reducing overhead of channel state information report (i.e., feedback) in a wireless communication system.

Specifically, the present disclosure proposes a method for performing only feedback on some valid information, not feedback on entire information by considering sparsity of a channel.

It is to be understood that technical objects to be achieved by the present disclosure are not limited to the aforementioned technical object and other technical objects which are not mentioned herein will be apparent from the following description to one of ordinary skill in the art to which the present disclosure pertains.

Technical Solution

In an aspect, provided is a method for reporting, by a user equipment (UE), channel state information (CSI) in a wireless communication system, which includes: receiving, from a base station, configuration information related to a CSI report on a downlink channel; receiving, from the base station, at least one CSI-RS for the CSI report; calculating feedback information by means of the at least one CSI-RS; and reporting the CSI to the base station by using the calculated feedback information, in which the configuration information may include information for at least one valid region related to the calculation of the feedback information, and the feedback information may include position information and a value for at least one channel matrix element included in a specific valid region.

Furthermore, in the method according to the embodiment of the present disclosure, the information for the at least one valid region may include a position of a center channel matrix element of each valid region, a range of each valid range, and/or an index of each valid region.

Furthermore, in the method according to the embodiment of the present disclosure, the calculating of the feedback information may include: generating a first channel matrix based on measurement for the at least one CSI-RS; generating a second channel matrix by applying a preconfigured transform matrix to the first channel matrix; generating a third channel matrix by applying the specific valid region to the second channel matrix; and calculating the feedback information by quantizing the third channel matrix.

Furthermore, in the method according to the embodiment of the present disclosure, the generating of the third channel matrix by applying the specific valid region to the second channel matrix may include configuring, to 0, remaining elements other than elements satisfying a preconfigured threshold condition among elements of the second channel matrix.

Furthermore, in the method according to the embodiment of the present disclosure, the configuration information may further include angular information related to the downlink channel, and the generating of the third channel matrix by applying the specific valid region to the second channel matrix may include configuring, to 0, remaining elements other than specific elements configured based on the angular information among the elements of the second channel matrix.

Furthermore, in the method according to the embodiment of the present disclosure, the angular information may include an angle of departure (AoD) and a support region of the AoD, and the specific elements may include a center element configured by using the AoD and the support region and elements located within a predetermined range based on the center element.

Furthermore, in the method according to the embodiment of the present disclosure, the preconfigured transform matrix may be configured based on a spatial rotation matrix shared between the UE and the base station, and the feedback information may include a spatial rotation parameter related to the spatial rotation matrix.

Furthermore, in the method according to the embodiment of the present disclosure, the first channel matrix may be a channel covariance matrix by the at least one CSI-RS.

Furthermore, the method according to the embodiment of the present disclosure may further include receiving, from the base station, information for the number of the at least one valid region.

In another aspect, provided is a user equipment (UE) reporting channel state information (CSI) in a wireless communication system, which includes: a Radio Frequency (RF) unit for transmitting/receiving a radio signal; and a processor functionally connected to the RF unit, in which the processor may be configured to: receive, from a base station, configuration information related to a CSI report on a downlink channel; receive, from the base station, at least one CSI-RS for the CSI report; calculate feedback information by means of the at least one CSI-RS; and report the CSI to the base station by using the calculated feedback information, and the configuration information may include information for at least one valid region related to the calculation of the feedback information, and the feedback information may include position information and a value for at least one channel matrix element included in a specific valid region.

Furthermore, in the UE according to the embodiment of the present disclosure, the information for the at least one valid region may include a position of a center channel matrix element of each valid region, a range of each valid range, and/or an index of each valid region.

Furthermore, in the UE according to the embodiment of the present disclosure, the processor may be configured to, in association with the calculation of the feedback information, generate a first channel matrix based on measurement for the at least one CSI-RS; generate a second channel matrix by applying a preconfigured transform matrix to the first channel matrix; generate a third channel matrix by applying the specific valid region to the second channel matrix; and calculate the feedback information by quantizing the third channel matrix.

Furthermore, in the UE according to the embodiment of the present disclosure, the processor may be configured to configure, to 0, remaining elements other than elements satisfying a preconfigured threshold condition among elements of the second channel matrix in association with the generation of the third channel matrix.

Furthermore, in the UE according to the embodiment of the present disclosure, the configuration information may further include angular information related to the downlink channel, and the processor may be configured to, in association with the generation of the third channel matrix, configure, to 0, remaining elements other than specific elements configured based on the angular information among the elements of the second channel matrix.

In yet another aspect, provided is a base station receiving a channel state information (CSI) report in a wireless communication system, which includes: a Radio Frequency (RF) unit for transmitting/receiving a radio signal; and a processor functionally connected to the RF unit, in which the processor may be configured to: transmit, to a user equipment (UE), configuration information related to the CSI report on a downlink channel; transmit, to the UE, at least one CSI-RS for the CSI report; and receive, from the UE, the CSI report including feedback information calculated by the UE by using the at least one CSI-RS, the configuration information may include information for at least one valid region related to the calculation of the feedback information, and the feedback information may include position information and a value for at least one channel matrix element included in a specific valid region.

Advantageous Effects

According to an embodiment of the present disclosure, there is an effect in that since channel information is reported by extracting only a part having significant information from covariance matrix information of channel information, it is possible to configure the channel information with low overhead while enhancing accuracy of the channel information.

Furthermore, according to an embodiment of the present disclosure, there is an advantage in that since there is no operation having a special computational complexity for optimization of a spatial rotation parameter and setting of a valid region to be performed by a UE, it is easy to implement the UE.

It will be appreciated by those skilled in the art that the effects that can be achieved with the present disclosure are not limited to what has been described above and other advantages of the present disclosure will be clearly understood from the following detailed description taken in conjunction with the accompanying drawings.

DESCRIPTION OF DRAWINGS

The accompanying drawings, which are included herein as a part of a description in order to help understanding of the present disclosure, provide embodiments of the present disclosure, and describe the technical features of the present disclosure with the description below.

FIG. 1 illustrates an example of an overall structure of a new radio (NR) system to which a method proposed by the present disclosure may be implemented.

FIG. 2 illustrates a relationship between a uplink (UL) frame and a downlink (DL) frame in a wireless communication system to which a method proposed by the present disclosure may be implemented.

FIG. 3 illustrates an example frame structure in an NR system.

FIG. 4 illustrates an example of a resource grid supported in a wireless communication system to which a method proposed by the present disclosure may be implemented.

FIG. 5 illustrates examples of resource grids for each antenna port and numerology to which a method proposed in the present disclosure is applicable.

FIG. 6 illustrates an example self-contained structure to which a method proposed herein is applicable.

FIG. 7 illustrates an example of a method for transmitting and receiving a signal.

FIG. 8 illustrates an example of an SSB structure.

FIG. 9 illustrates an example of SSB transmission.

FIG. 10 illustrates an example in which a UE acquires information on DL time synchronization.

FIG. 11 illustrates an example of a system information (SI) acquisition process.

FIG. 12 illustrates an example of a random access procedure.

FIG. 13 illustrates an example of a threshold value for an SS block for RACH resource association.

FIG. 14 illustrates an example of a power ramping counter of a PRACH.

FIG. 15 illustrates an example for a size of an angular domain for each element of a covariance matrix for a DL channel.

FIG. 16 illustrates an example of a signaling procedure between an eNB and a UE for CSI feedback to which an embodiment proposed in the present disclosure is applicable.

FIG. 17 illustrates an example of a channel sparsity effect to which spatial rotation and DFT operations are applied, to which an embodiment proposed in the present disclosure is applicable.

FIG. 18 illustrates an example of a valid region of channel information and an index for each valid region to which an embodiment proposed in the present disclosure is applicable.

FIG. 19 illustrates a specific example of configuring the valid region of the channel information to which an embodiment proposed in the present disclosure is applicable.

FIG. 20 illustrates an example of a signaling procedure between an eNB and a UE for CSI feedback to which another embodiment proposed in the present disclosure is applicable.

FIG. 21 illustrates an example of a flowchart of an operation of a UE performing a CSI report in a wireless communication system to which a method proposed in the present disclosure is applicable.

FIG. 22 illustrates an example of a flowchart of an operation of an eNB receiving a CSI report in a wireless communication system to which a method proposed in the present disclosure is applicable.

FIG. 23 illustrates an example of a block diagram of a wireless communication device to which methods proposed in the present disclosure are applicable.

FIG. 24 illustrates a block diagram of a communication device according to an embodiment of the present disclosure.

FIG. 25 illustrates an example of an RF module of a wireless communication device to which a method proposed in the present disclosure is applicable.

FIG. 26 illustrates another example of an RF module of a wireless communication device to which a method proposed in the present disclosure is applicable.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

Hereinafter, downlink (DL) means communication from a base station to a terminal and uplink (UL) means communication from the terminal to the base station. In the downlink, a transmitter may be part of the base station, and a receiver may be part of the terminal. In the uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a robot, and the like. Further, a 'terminal' may be fixed or mobile and may be replaced with terms including a user equipment (UE), a mobile station (MS), a user terminal (UT), a mobile subscriber station (MSS), a subscriber station (SS), Advanced Mobile Station, a Wireless Terminal (WT), a Machine-Type Communication (MTC) device, a Machine-to-Machine (M2M) device, and a Device-to-Device (D2D) device, a vehicle, a robot, an AI module, and the like.

The following technology may be used in various wireless access systems including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of IEEE 802.11 (Wi-Fi), IEEE 802.16 (WiMAX), IEEE 802.20, Evolved UTRA (E-UTRA), or the like. The UTRA is part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP New Radio (NR) or New Radio Access Technology is an evolved version of the 3GPP LTE/LTE-A/LTE-A pro.

For clarity of description, the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. The LTE/NR may be collectively referred to as the 3GPP system. Matters disclosed in a standard document published before the present disclosure may refer to a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology. Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next-generation radio access technology considering enhanced mobile broadband communication (eMBB), massive MTC (mMTC), ultra-reliable and low latency communication (URLLC) is discussed, and in the present disclosure, the technology is called NR for convenience. The NR is an expression representing an example of 5G radio access technology (RAT).

In a New RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerology may be defined by scaling reference subcarrier spacing to an integer N.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^{\mu} \in \{0, \ldots, N_{subframe}^{slots,\mu}-1\}$ in a subframe, and in ascending order of $n_{s,f}^{\mu} \in \{0, \ldots, N_{frame}^{slots,\mu}-1\}$ in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu} N_{symb}^{\mu}$ in the same subframe.

Not all UEs are able to transmit and receive at the same time, and this means that not all OFDM symbols in a DL slot or an UL slot are available to be used.

Table 2 shows the number ($N_{symb}^{slot}$) of OFDM symbols per slot, the number ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example frame structure in an NR system. FIG. 3 is intended merely for illustration purposes but not for limiting the scope of the disclosure.

Table 3 represents an example where μ=2, i.e., the sub-carrier spacing (SCS) is 60 kHz. Referring to Table 2, one subframe (or frame) may include four slots. The "1 sub-frame={1,2,4} slots" in FIG. 3 is an example, and the number of slots that may be included in one subframe may be defined as shown in Table 2.

The mini-slot may consist of 2, 4, or 7 symbols or more or less symbols.

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Frequency shift, average received power, and Received Timing.

FIG. 4 illustrates an example of a resource grid supported in a wireless communication system to which a method proposed by the present disclosure may be implemented.

Referring to FIG. 4, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 5, one resource grid may be configured for the numerology μ and an antenna port p.

FIG. 5 illustrates examples of resource grids for each antenna port and numerology to which a method proposed in the present disclosure is applicable.

Each element of the resource grid for the numerology μ and the antenna port p is indicated as a resource element, and may be uniquely identified by an index pair (k,l̄). Herein, k=0, ..., $N_{RB}^{\mu} N_{sc}^{RB}-1$ is an index in the frequency domain, and l̄=0, ..., $2^{\mu} N_{symb}^{(\mu)}-1$ indicates a location of a symbol in a subframe. To indicate a resource element in a slot, the index pair (k,l) is used. Herein, l=0, ..., $N_{symb}^{\mu}-1$.

The resource element (k,l̄) for the numerology μ and the antenna port p corresponds to a complex value $a_{k,l̄}^{(p,\mu)}$. When there is no risk of confusion or when a specific antenna port or numerology is specified, the indexes p and μ may be dropped and thereby the complex value may become $a_{k,l̄}^{(p)}$ or $a_{k,l̄}$.

The physical resource block is defined with $N_{sc}^{RB}=12$ consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration μ.

The center of subcarrier 0 of common resource block 0 for subcarrier spacing configuration μ matches 'point A.'. In the frequency domain, resource elements (k,l) for common resource block number $n_{CRB}^{\mu}$ and subcarrier spacing configuration μ may be given as Equation 1 below.

$$n_{CRB}^{\mu} = \left\lfloor \frac{k}{N_{sc}^{RB}} \right\rfloor \quad \text{[Equation 1]}$$

Here, k may be defined relative to point A so that k=0 corresponds to the subcarrier with point A centered. The physical resource blocks are numbered from 0 to $N_{BWP,i}^{size}-1$ in the bandwidth part (BWP), and i is the number of the BWP. In BWP i, the relationship between physical resource block $n_{PRB}$ and common resource block $n_{CRB}$ may be given as Equation 2 below.

$$n_{CRB} = n_{PRB} + N_{BWP,i}^{start} \quad \text{[Equation 2]}$$

Here, $N_{BWP,i}^{start}$ may be common resource blocks in which the BWP starts relative to common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, Mmtc, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the eNB may instruct the UE to operate only in a partial bandwidth rather than the entire bandwidth of the wideband CC and the corresponding partial bandwidth is defined as the bandwidth part (BWP) for convenience. The BWP may be constituted by consecutive resource blocks (RBs) on the frequency axis and may correspond to one numerology (e.g., sub-carrier spacing, CP length, slot/mini-slot duration).

Meanwhile, the eNB may configure multiple BWPs even in one CC configured to the UE. As one example, a BWP occupying a relatively small frequency domain may be configured in a PDCCH monitoring slot and a PDSCH indicated in PDCCH may be scheduled onto a BWP larger therethan. Alternatively, when UEs are concentrated on a specific BWP, some UEs may be configured to other BWPs for load balancing. Alternatively, a partial spectrum of the entire bandwidth may be excluded and both BWPs may be configured even in the same slot by considering frequency domain inter-cell interference cancellation between neighboring cells. In other words, the eNB may configure at least one DL/UL BWP to the UE associated with the wideband CC and activate at least one DL/UL BWP (by L1 signaling or MAC CE or RRC signaling) among configured DL/UL BWP(s) at a specific time and switching may be indicated to another configured DL/UL BWP (by L1 signaling or MAC CE or RRC signaling) or when a timer value is expired based on a timer, the timer value may be switched to the DL/UL BWP. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 6 illustrates one example of a self-contained structure to which the method proposed in the present disclosure is applicable. FIG. 5 is just for convenience of the description and does not limit the scope of the present disclosure.

Referring to FIG. 6, it is assumed that one transmission unit (e.g., slot or subframe) is constituted by 14 orthogonal frequency division multiplexing (OFDM) symbols as in legacy LTE.

In FIG. 6, a region 602 refers to a downlink control region and a region 604 refers to an uplink control region. Further, a region (that is, a region without a separate indication) other than the regions 602 and 604 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 6 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 6, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Method for Transmitting and Receiving Radio Signal

FIG. 7 illustrates an example of a method for transmitting and receiving a signal.

Referring to FIG. 7, when the UE is powered on or newly enters a cell, the UE performs an initial cell search operation such as synchronizing with the eNB (S701). To this end, the UE may receive a Primary Synchronization Channel (P-SCH) and a Secondary Synchronization Channel (S-SCH) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message for the preamble through the PDCCH and a corresponding PDSCH (S704 and S706). In the case of a contention based RACH, a Contention Resolution Procedure may be additionally performed.

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE receives Downlink Control Information (DCI) through the PDCCH. Here, the DCI may include control information such as resource allocation information for the UE and formats may be different from each other according to a use purpose.

Meanwhile, the control information which the UE transmits to the eNB through the uplink or the UE receives from the eNB includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as the CQI/PMI/RI, etc., through the PUSCH and/or PUCCH.

Table 4 shows an example of a DCI format in the NR system.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |

Referring to Table 4, DCI format 0_0 is used for scheduling of the PUSCH in one cell.

Information included in DCI format 0_0 is CRC-scrambled and transmitted by C-RNTI, CS-RNTI, or MCS-C-RNTI. In addition, DCI format 0_1 is used for reserving the PUSCH in one cell. Information included in DCI format 0_1 is CRC-scrambled and transmitted by C-RNTI, CS-RNTI, SP-CSI-RNTI, or MCS-C-RNTI. DCI format 1_0 is sued for scheduling of the PDSCH in one DL cell. Information included in DCI format 1_0 is CRC-scrambled and transmitted by C-RNTI, CS-RNTI, or MCS-C-RNTI. DCI format 1_1 is used for scheduling of the PDSCH in one cell. Information included in DCI format 1_1 is CRC-scrambled and transmitted by C-RNTI, CS-RNTI, or MCS-C-RNTI. DCI format 2_1 is used to inform PRB(s) and OFDM symbol(s) of which the UE may assume not intending transmission.

The following information included in DCI format 21 is CRC-scrambled and transmitted by INT-RNTI.

Initial Access (IA) Procedure (1) Synchronization Signal Block (SSB) Transmission and Related Operation FIG. 8 illustrates an SSB structure. The UE may perform cell search, system information acquisition, beam alignment for initial access, DL measurement, etc., based on an SSB.

The SSB is mixedly used with an SS/Synchronization Signal/Physical Broadcast channel (PBCH) block.

Referring to FIG. 8, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

(2) Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 5 below.

TABLE 5

| | Type of Signals | Operations |
|---|---|---|
| 1st step | PSS | * SS/PBCH block (SSB) symbol timing acquisition<br>* Cell ID detection within a cell ID group (3 hypothesis) |
| 2nd Step | SSS | * Cell ID group detection (336 hypothesis) |
| 3rd Step | PBCH DMRS | * SSB index and Half frame (HF) index (Slot and frame boundary detection) |
| 4th Step | PBCH | * Time information (80 ms, System Frame Number (SFN), SSB index, HF)<br>* Remaining Minimum System Information (RMSI) Control resource set (CORESET)/Search space configuration |
| 5th Step | PDCCH and PDSCH | * Cell access information<br>* RACH configuration |

There are 336 cell ID groups, and three cell IDs exist for each cell ID group. There may be a total of 1008 cell IDs and the cell ID may be defined by Equation 3.

$$N_{ID}^{cell} = 3N_{ID}^{(1)} + N_{ID}^{(2)} \quad \text{[Equation 3]}$$

Here, $N_{ID}^{(1)} \in \{0, 1, \ldots, 335\}$ and $N_{ID}^{(2)} \in \{0,1,2\}$.

Here, NcellID represents a cell ID (e.g., PCID). N(1)ID represents a cell ID group and is provided/acquired through the SSS. N(2)ID represents a cell ID in the cell ID group and is provided/acquired through the PSS.

PSS sequence dPSS(n) may be defined to satisfy Equation 4.

$$d_{PSS}(n) = 1 - 2x(m)$$

$$m = (n + 43 N_{ID}^{(2)}) \bmod 127$$

$$0 \le n < 127 \quad \text{[Equation 4]}$$

Here, $x(i+7) = (x(+4) + x(i)) \bmod 2$ and,
$[x(6)\ x(5)\ x(4)\ x(3)\ x(2)\ x(1)\ x(0)] = [1\ 1\ 1\ 0\ 1\ 1\ 0]$ SSS sequence dSSS(n) may be defined to satisfy Equation 5.

$$d_{SSS}(n) = [1 - 2x_0((n+m_0) \bmod 127)] \quad \text{[Equation 5]}$$
$$[1 - 2x_1((n+m_1) \bmod 127)]$$

$$m_0 = 15 \left\lfloor \frac{N_{ID}^{(1)}}{112} \right\rfloor + 5 N_{ID}^{(2)}$$

$$m_1 = N_{ID}^{(1)} \bmod 112$$

$$0 \le n < 127$$

$$x_0(i+7) = (x_0(i+4) + x_0(i)) \bmod 2$$

Here, $x_1(i+7) = (x_1(i+1) + x_1(i)) \bmod 2$ and,
$[x_0(6)\ x_0(5)\ x_0(4)\ x_0(3)\ x_0(2)\ x_0(1)\ x_0(0)] = [0\ 0\ 0\ 0\ 0\ 0\ 1]$
$[x_1(6)\ x_1(5)\ x_1(4)\ x_1(3)\ x_1(2)\ x_1(1)\ x_1(0)] = [0\ 0\ 0\ 0\ 0\ 0\ 1]$ FIG. 9 illustrates SSB transmission.

The SSB is periodically transmitted according to SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

For frequency range up to 3 GHz, L=4
For frequency range from 3 GHz to 6 GHz, L=8
For frequency range from 6 GHz to 52.6 GHz, L=64

A time position of an SSB candidate in the SS burst set may be defined as follows according to SCS. The time positions of the SSB candidates are indexed from 0 to L−1 in chronological order within the SSB burst set (i.e., half-frame).

Case A—15 kHz SCS: The index of the start symbol of the candidate SSB is given as {2, 8}+14*n. When the carrier frequency is 3 GHz or less, n=0, 1. When the carrier frequency is 3 to 6 GHz or less, n=0, 1, 2, 3.

Case B—30 kHz SCS: The index of the start symbol of the candidate SSB is given as {4, 8, 16, 20}+28*n. When the carrier frequency is 3 GHz or less, n=0. When the carrier frequency is 3 to 6 GHz, n=0, 1.

Case C—30 kHz SCS: The index of the start symbol of the candidate SSB is given as {2, 8}+14*n. When the carrier frequency is 3 GHz or less, n=0, 1. When the carrier frequency is 3 to 6 GHz or less, n=0, 1, 2, 3.

Case D—120 kHz SCS: The index of the start symbol of the candidate SSB is given as {4, 8, 16, 20}+28*n. When the carrier frequency is more than 6 GHz, n=0, 1, 2, 3, 5, 6, 7, 8, 10, 11, 12, 13, 15, 16, 17, 18.

Case E—240 kHz SCS: The index of the start symbol of the candidate SSB is given as {8, 12, 16, 20, 32, 36, 40, 44}+56*n. When the carrier frequency is more than 6 GHz, n=0, 1, 2, 3, 5, 6, 7, 8.

FIG. 10 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences (b0 to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 1 bit which remain after indicating the SSB index among 3 bits which may be indicated by using eight PBCH DRMS sequences may be used for the half frame indication (b2).

(3) System Information Acquisition

FIG. 11 illustrates a system information (SI) acquisition process. The UE may acquire AS-/NAS-information through an SI acquisition process. The SI acquisition process may be applied to UEs which are in an RRC_IDLE state, an RRC_INACTIVE state, an RRC_CONNECTED state.

The SI is divided into a master information block (MIB) and a plurality of system information blocks (SIB). SI other than the MIB may be referred to as Remaining Minimum System Information (RSI). The following may be referred to for details.

The MIB includes information/parameters related to SystemInformationBlock1 (SIB1) reception and is transmitted through the PBCH of the SSB. In initial cell selection, the UE assumes that the half frame with the SSB is repeated with a periodicity of 20 ms. The UE may check whether a Control Resource Set (CORESET) for a Type0-PDCCH common search space exists based on the MIB. The Type0-PDCCH common search space is a kind of PDCCH search space and is used to transmit a PDCCH for scheduling an SI message. If there is the Type0-PDCCH common search space, the UE may determine (i) a plurality of continuous RBs and one or more continuous symbols constituting the CORESET and (ii) a PDCCH occasion (i.e., a time domain location for receiving the PDCCH) based on information (e.g., pdcch-ConfigSIB1) in the MIB. If there is no Type0-PDCCH common search space, pdcch-ConfigSIB1 provides information on a frequency location where SSB/SIB1 exists and a frequency range where the SSB/SIB1 does not exist.

The SIB1 contains information related to the availability and scheduling (e.g., transmission periodicity, SI-window size) of the remaining SIBs (hereinafter, referred to as SIBx, x is an integer of 2 or more). For example, the SIB1 may inform whether the SIBx is periodically broadcasted or whether the SIBx is provided by a request of the UE according to an on-demand scheme. When the SIBx is provided by the on-demand scheme, the SIB1 may include information which the UE requires for performing an SI request. The SIB1 is transmitted through the PDSCH, the PDCCH for scheduling the SIB1 is transmitted through the Type0-PDCCH common search space, and the SIB1 is transmitted through the PDSCH indicated by the PDCCH.

The SIBx is included in the SI message and transmitted through the PDSCH. Each SI message is transmitted within a time window (i.e., SI-window) which periodically occurs.

Random Access (RA) Procedure

The random access procedure of the UE may be summarized as shown in Table 6 and FIG. 12.

FIG. 12 illustrates an example of a random access procedure.

TABLE 6

| | Type of signal | Acquired operation/information |
|---|---|---|
| First phase | PRACH Preamble in UL | * Initial beam acquisition<br>* Random selection of RA-preamble ID |
| Second phase | Random access response on DL-SCH | * Timing alignment information<br>* RA-preamble ID<br>* Initial UL grant or temporary C-RNTI |
| Third phase | UL transmission on UL-SCH | * RRC connection request<br>* UE identifier |
| Fourth phase | Contention resolution on DL | * Temporary C-RNTI on PDCCH for initial access<br>* C-RNTI on PDCCH for UE in RRC_CONNECTED |

First, the UE may transmit a PRACH preamble as Msg1 of a random access procedure in UL.

Random access preamble sequences having two different lengths are supported. Long sequence length 839 is applied as subcarrier spacing of 1.25 and 5 kHz, and short sequence length 139 is applied as subcarrier spacing of 15, 30, 60 and 120 kHz. Long sequences support both unrestricted sets and restricted sets of type A and type B, while short sequences support only unrestricted sets.

Multiple RACH preamble formats are defined with one or more RACH OFDM symbols, different cyclic prefixes, and guard time. A PRACH preamble configuration for use is provided to the UE in the system information.

If there is no response to Msg1, the UE may retransmit the PRACH preamble within a predetermined number of times by power ramping. The UE calculates PRACH transmission power for retransmission of the preamble based on the most recent pathloss and power ramping counter. When the terminal performs beam switching, the counter of power ramping remains unchanged.

The system information informs the UE of an association between the SS block and the RACH resource.

FIG. 13 illustrates an example of a threshold value for an SS block for RACH resource association.

A threshold value of the SS block for RACH resource association is based on RSRP and a configurable network. Transmission or retransmission of the RACH preamble is based on SS blocks that meet the threshold value.

When the UE receives a random access response on the DL-SCH, the DL-SCH may provide timing alignment information, RA-preamble ID, initial UL grant, and temporary C-RNTI.

Based on this information, the UE may transmit the UL transmission on the UL-SCH as Msg3 of the random access procedure. The Msg3 may include the RRC connection request and the UE identifier.

In response thereto, the network may transmit Msg4 and the Msg4 may be handled as a contention resolution message in DL. By receiving the Msg4, the UE may enter the RRC connected state.

Detailed descriptions of respective steps are as follows.

Before initiating a physical random access procedure, Layer-1 should receive a set of SS/PBCH block indexes from a higher layer and should provide, to the higher layer, a set of RSRP measurements corresponding thereto.

Before initiating the physical random access procedure, Layer-1 should receive the following information from the higher layer:

Configuration of physical random access channel (PRACH) transmission parameters (PRACH preamble format, time resource, and frequency resource for PRACH transmission).

A PRACH preamble sequence set (index to logical root sequence table and cyclic shift (N_CS), and root sequences in a type of set (unrestricted set, restricted set A, or restricted set B) and parameters for determining the cyclic shifts thereof.

From the viewpoint of the physical layer, the L1 random access procedure includes transmission of a random access preamble (Msg1) in a PRACH, a random access response (RAR) message (Msg2) with PDCCH/PDSCH, and transmission of Msg3 PUSCH and PDSCH for contention resolution, if applicable.

When the random access procedure is initiated by A "PDCCH order" to the UE, the random access preamble transmission is performed with the same subcarrier spacing as the random access preamble transmission initiated by the higher layer.

When the UE is constituted by two UL carriers for one service cell and the UE detects the "PDCCH order", the UE uses a UL/SUL (supplement UL) indicator field value from the detected "PDCCH order" and determines a UL carrier for the corresponding random access preamble transmission.

In association with a random access preamble transmission step, the physical random access procedure is triggered by a request for PRACH transmission by the higher layer or PDCCH order. A configuration by the higher layer for the PRACH transmission includes:

Configuration for PRACH transmission.
Preamble index, inter-preamble subcarrier spacing, $P_{PRACHtarget}$, corresponding RA-RNTI, and PRACH resource.

The preamble is transmitted as transmission power $P_{PRACH,f,c}(i)$ by using a PRACH format selected on an indicated PRACH resource.

Multiple SS/PBCH blocks associated with one PRACH occasion are provided to the UE by a value of higher layer parameter SSB-perRACH-Occasion. When the value of SSB-perRACH-Occasion is less than 1, one SS/PBCH block is mapped to 1/SSB-per-rach-occasion consecutive PRACH occasions. The UE is provided with a number of preambles per SS/PBCH block by the value of the higher layer parameter cb-preamblePerSSB, and the UE determines the total number of preambles per SSB per PRACH as the multiples of the value of SSB-perRACH-Occasion and the value of cb-preamblePerSSB.

The SS/PBCH block index is mapped to the PRACH occasions in the following order.

First, mapping the SS/PBCH block index in an increasing order of preamble indexes in a single PRACH occasion Second, mapping the SS/PBCH block index in an increasing order of frequency resource indexes for frequency multiplex PRACH occasions Third, mapping the SS/PBCH block index in an increasing order of time resource indexes for time multiplex PRACH occasions in a PRACH slot Fourth, mapping the SS/PBCH block index in an increasing order of indexes for the PRACH slot Periodicity for mapping to the PRACH occasions for the SS/PBCK block begins from frame 0 and is a smallest value among {1, 2, 4} PRACH configuration periodicities which is equal to or more than $\lceil N_{Tx}^{SSB}/N_{PRACH\ period}^{SSB} \rceil$ and in this case, the UE acquires $N_{Tx}^{SSB}$ from higher layer parameter SSB-transmitted-SIB1 and $N_{PRACHperiod}^{SSB}$ represents the number of SS/PBCH blocks which may be mapped to one PRACH configuration periodicity.

When the random access procedure is initiated by the PDCCH order, when the higher layer requests, the UE will transmit the PRACH at a first available PRACH opportunity at a request from the higher layer and in this case, in the case of the PDCCH, a time between a last received symbol and a first symbol of PRACH transmission is equal to or more than $N_{T,2}+\Delta_{BWPSwitching}+\Delta_{Delay}$ milliseconds, and here, $N_{T,2}$ represents a duration of $N_2$ symbols for a PUSCH processing capacity and $\Delta_{BWPSwitching}$ is defined in advance and $\Delta_{Delay}>0$.

In response to the PRACH transmission, the UE attempts to detect the PDCCH having the corresponding RA-RNTI during the window controlled by the higher layer. The window starts at the first symbol of the earliest control resource set configured by the UE for the Type1-PDCCH general search space, that is, at least $[(\Delta \cdot N_{slot}^{subframe,\mu} \cdot N_{symb}^{slot})/T_{sf}]$ symbols after the symbol after the last symbol of the preamble sequence transmission. The length of the window as the number of slots is provided by the higher layer parameter rar-WindowLength based on the spacing between subcarriers for the Type0-PDCCH general search space.

When the UE detects a PDCCH having RAN-RANTI and the corresponding PDSCH including a DL-SCH transport block in the corresponding window, the UE transfers the transport block to the higher layer. The higher layer parses a transport block for random access preamble identification (RAPID) associated with the PRACH transmission. When the higher layer identifies the RAPID in a RAR message(s) of the DL-SCH transport block, the higher layer instructs to allow the uplink to the physical layer. This is referred to as a random access response (RAR) UL grant in the physical layer. When the higher layer does not identify the RAPID associated with the PRACH transmission, the higher layer may instruct to transmit the PRACH to the physical layer. A minimum time between the last symbol of the PDSCH reception and the first symbol of the PRACH transmission is equal to $N_{T,1}+\Delta_{new}+0.5$ milliseconds and here, $N_{T,1}$ represents a duration of $N_1$ symbols corresponding to a PDSCH reception time for PDSCH processing capacity 1 when additional PDSCH DM-RS is configured and $\Delta_{new} \geq 0$.

The UE will receive a corresponding PDSCH including a PDCCH having a corresponding RA-RNTI and a detected SS/PBCH block or a DL-SCH transport block having the same DM-RS antenna port quasi co-location (QCL) attribute as the received CSI-RS. When the UE attempts to detect the PDCCH having the corresponding RA-RNTI in response to the PRACH transmission initiated by the PDCCH order, the UE assumes that the PDCCH and the PDCCH order have the same DM-RS antenna port QCL attribute.

RAR UL grant schedules PUSCH transmission from the UE (Msg3 PUSCH). Contents of RAR UL grant start at MSB and end at LSB, and are given in Table 7. Table 7 shows a random access response grant content field size.

TABLE 7

| RAR grant field | Number of bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

The Msg3 PUSCH frequency resource allocation is for uplink resource allocation type 1. In the case of frequency hopping, based on the indication of the frequency hopping flag field, the first one or two bits of the Msg3 PUSCH frequency resource allocation field and $N_{UL,hop}$ bits are used as hopping information bits.

The MCS is determined from first 16 indexes of an MCS index table applicable to the PUSCH.

TPC command $\delta_{msg2,b,f,c}$ is used for configuring power of Msg3 PUSCH and construed according to Table 8. Table 8 shows TPC command $\delta_{msg2,b,f,c}$ for Msg3 PUSCH.

TABLE 8

| TPC command | Value (dB unit) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a non-contention based random access procedure, it is construed that the CSI request field determines whether an aperiodic CSI report is included in the corresponding PUSCH transmission. In a contention based random access procedure, the CSI request field is reserved.

When the spacing between the subcarriers is not configured in the UE, the UE receives a subsequent PDSCH by using the same spacing between subcarriers as a case of PDSCH reception providing the RAR message.

When the UE does not detect PDCCH having the corresponding RAN-RNTI and the corresponding DL-SCH transport block in the window, the UE performs a procedure for failure to receive a random access response.

For example, the UE may perform power ramping for retransmission of the random access preamble based on a power ramping counter. However, as illustrated in FIG. 14, the UE performs beam switching in PRACH retransmission, the power ramping counter is maintained unchanged.

FIG. 14 illustrates an example of a power ramping counter of a PRACH.

In FIG. 14, the UE may increase the power ramping counter by 1 when retransmitting the random access preamble for the same beam. However, when the beam is changed, the power ramping counter is not changed but maintained.

With regard to Msg3 PUSCH transmission, the higher layer parameter msg3-tp indicates whether the UE should apply transform precoding for Msg3 PUSCH transmission to the UE. When the UE applies transmission transform precoding to Msg3 PUSCH having frequency hopping, a frequency offset for a second hop is given in Table 9. Table 9 shows a frequency offset for a second hop for transmission of Msg3 PUSCH having the frequency hopping.

TABLE 9

| Number of PRBs in initial active UL BWP | Value of $N_{UL,hop}$ hopping bit | Frequency offset for 2nd hop |
|---|---|---|
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | reserved |

The spacing between subcarriers for Msg3 PUSCH transmission is provided by higher layer parameter msg3-scs. The UE will transmit PRACH and Msg3 PUSCH on the same uplink carrier of the same service providing cell. UL BWP for Msg3 PUSCH transmission is indicated by SystemInformationBlock1.

When PDSCH and PUSCH have the same inter-subcarrier spacing, a minimum time between a last signal of PDSCH reception of transmitting RAR and a first signal of corresponding Msg3 PUSCH transmission scheduled by RAR in PDSCH for the UE is equal to $N_{T,1}+N_{T,2}+N_{TA,max}+0.5$ milliseconds. $N_{T,1}$ represents a duration of $N_1$ symbols corresponding to the PDSCH reception time for PDSCH processing capacity 1 when the additional PDSCH DM-RS is configured, $N_{T,2}$ represents a duration of symbols corresponding to a PUSCH preparation time for PUSCH processing capacity 1, and $N_{TA,max}$ represents a maximum timing adjustment value which may be provided by a TA command field in RAR.

When C-RNTI is not provided to the UE in response to Msg3 PUSCH transmission, the UE attempts to detect a PDCCH having a corresponding TC-RNTI scheduling a PDSCH that includes identification of UE contention resolution. In response to the reception of the PDSCH having the identification of the UE contention resolution, the UE transmits HARQ-ACK information into the PUCCH. A minimum time between the last symbol of PDSCH reception and the first symbol of HARQ-ACK transmission corresponding thereto is equal to $N_{T,1}+0.5$ milliseconds. $N_{T,1}$ represents the duration of $N_1$ symbols corresponding to the PDSCH reception time for PDSCH processing capacity 1 when the additional PDSCH DM-RS is configured.

Explicit CSI Feedback

In the legacy communication system (e.g., LTE system), a closed-loop multi input multi output (MIMO) operation through implicit CSI feedback (i.e., implicit CSI reporting) is being performed. Therefore, additionally, in a next-generation mobile communication system (e.g., NR system), explicit CSI feedback (i.e., explicit CSI report) may be considered, which may enhance performance of multi user (MU)-MIMO based on more sophisticated channel information in a massive MIMO environment considering a large number of antennas in the eNB and the UE.

The explicit CSI feedback may mean a scheme of quantizing the channel information measured by the UE with high resolution and transferring the quantized channel information to the eNB. In this case, the channel information may be classified into three information as shown in Table 10 according to a transfer type of the channel, and N_T represents the number of an eNB antenna ports, N_R represents the number of UE antenna ports, and k represents the number of dominant eigenvectors.

TABLE 10

Channel information 1: Channel matrix $H \in C^{N_R \times N_T}$
Channel information 2: Channel covariance matrix $H^H H \in C^{N_T \times N_T}$
Channel information 3: Dominant eigenvector(s) $U_k \in C^{N_T \times k}$ and eigenvalue(s) where $H^H H = U \Sigma U^H$, $\Sigma = \text{diag}[\sigma_1^2, \sigma_2^2, \ldots \sigma_{N_T}^2]$, $\sigma_1^2 \geq \sigma_2^2 \ldots \geq \sigma_{N_T}^2$, $U = [u_1, u_2, \ldots, u_{N_T}]$ and $U_k = [u_1, u_2, \ldots, u_k]$ Meanwhile, in the next-generation mobile communication system (e.g., NR system), an mmWave environment which is an ultra-high frequency band may also be considered in addition to massive MIMO. In such an environment, sparsity (that is, sparseness) in an angular domain for channel information of a transmitting/receiving terminal tends to increase, and detailed contents thereof may be as illustrated in FIG. 15 and the corresponding description. Hereinafter, in the present disclosure, sparsity may refer to a characteristic in which certain information appears densely in a specific region(s).

FIG. 15 illustrates an example for a size of an angular domain for each element of a covariance matrix for a DL channel.

Referring to FIG. 15, it is assumed that the number of transmitting antenna ports of the eNB is 128. Referring to FIG. 15, it can be seen that valid information of a channel covariance matrix is densely distributed in a specific region.

In such a system environment, the amount of channel coefficients to be fed back by the UE may increase according to the number of eNB antenna ports in all three schemes (i.e., channel information 1, channel information 2, and channel information 3) described above. An example of the legacy explicit CSI feedback technique related thereto may be as follows.

First, in the case of channel information 1, feedback for all elements corresponding to a channel matrix may be required.

Further, in the case of channel information 2, feedback for all complex values of N_T×N_T may be required, and feedback may be required for $$\frac{N_T^2 + N_T}{2}$$

complex values even when considering Hermitian symmetry. In this case, if the size of the complex value is greater than or equal to a predetermined level, even in the case of a method of feeding back the value, feedback for position information and the complex value of the corresponding value may be required.

Further, in the case of channel information 3, according to the value of k for selecting a dominant eigenvector, feedback for channel information elements as many as N_T×k is required, and the computational complexity is O(N_T^3) by a decomposition technique of the UE.

In other words, the legacy explicit CSI feedback techniques generate very high feedback overhead in the massive MIMO environment, which leads to a decrease in system performance.

UL-DL Angular Reciprocity Frequency Division Duplexing (FDD)

Unlike Time Division Duplexing (TDD), in the case of FDD that uses different carrier frequencies for a transmission/reception signal, reciprocity for the channel information may not be guaranteed. However, due to the characteristics of the ultra-high frequency band, reciprocity may exist in an angular domain for the transmission/reception signal.

Here, the angular reciprocity may mean that a path or angle of the uplink (UL) signal and the angular spread are the same in the downlink (DL). This may be established even in an FDD environment in which the difference between the carrier frequencies of UL and DL is several GHz.

Accordingly, an angle characteristic of the DL may be calculated through angular information obtained through the UL signal, and by using the calculated angular characteristic, the number of instantaneous channel gains to which the UE needs to feedback may be greatly reduced. As an example, the characteristics of the UL channel may be as illustrated in FIG. 15.

FIG. 15 illustrates an example of magnitudes of azimuth angle of arrival (AoA) and energy for a UL channel.

Referring to FIG. 15, it can be seen that the valid information of the channel is concentrated in a limited support region for a specific number of AoAs. Based on the characteristics, the azimuth angle of departure (AoD) of the eNB and the range of the corresponding support region may be estimated based on |f_UL−f_DL| which is a difference value of the carrier frequency, which may be referred to as UL-DL angular reciprocity. Accordingly, for positions and regions having valid complex values of the DL channel covariance matrix, the AoD through a power-angle spectrum and the range of the corresponding support region may have a high correlation with each other.

In the case of the legacy explicit CSI feedback techniques as described above, there is a problem that the CSI feedback overhead may increase. Specifically, in the above-mentioned explicit CSI feedback schemes, as the number of antenna ports of the UE or the eNB increases, the feedback overhead for acquiring accurate channel information may increase. In addition, in a TDD environment, reciprocity of UL and DL channel information may be utilized, whereas in FDD, there is also a problem in that channel information of each link is different. Considering this, in the case of the explicit CSI feedback technique, it may be important to effectively transmit high-level accurate channel information while effectively reducing the feedback overhead.

Hereinafter, the present disclosure proposes methods for effectively reducing the overhead of the explicit CSI feedback. Specifically, rather than all elements for the channel information, a method for feeding back elements that significantly affect the accuracy of the channel information through additional signaling between the UE and the eNB that may utilize channel characteristics (e.g., sparsity) may be considered.

As an example, the present disclosure proposes a technique and a signaling procedure to achieve the above object by utilizing information related to channel sparsity characteristics occurring in an ultra-high frequency MIMO wireless communication environment. Here, the channel information is described based on the covariance matrix, but it is needless to say that extension is possible for other channel types.

In the embodiments described below, in order to determine and/or generate CSI, it is assumed that the UE receives a specific reference signal (RS) (e.g., CSI-RS, etc.) configured for CSI determination and/or generation from the eNB. The corresponding UE may determine (or calculate) the CSI by using a specific RS received thereby and may be configured to report the CSI to the eNB (in the form of feedback).

Further, the embodiments described below are only classified for convenience of description and it is needless to say that the configuration of one embodiment may be substituted with the configuration of another embodiment or may be applied in combination with each other.

First Embodiment

Hereinafter, a method for performing explicit CSI feedback by utilizing channel characteristics will be described in detail.

Method 1)

First, through specific signaling (e.g., RRC signaling, MAC-CE, DCI, etc.) between the UE and the eNB, positional information of elements corresponding to a specific region of channel information (e.g., sparse channel covariance matrix) and/or corresponding values may be configured to be fed back. As an example, the specific region may refer to a region where the valid information (or element) of the channel covariance matrix is concentrated and distributed due to sparsity characteristics.

In this case, the UE may be configured to report the positional information and the corresponding values in a long-term or a short-term. Further, when there is legacy reported positional information, the corresponding positional information may be reported by a differential scheme of feeding back only difference information from previously reported information.

Hereinafter, the scheme will be described in more detail.

The present disclosure proposes a method for utilizing channel sparsity in the considered system situation in order to reduce CSI feedback overhead.

In this case, a meaningful value of the channel information according to channel sparsity may have a feature of concentration in the specific region. Here, the meaningful channel information may mean information in which the size of the corresponding channel information element is equal to or greater than a specific reference value. Therefore, if the channel estimation method between the eNB and the UE and the channel characteristic information are determined and only the channel information having a significant value, not the entire channel information is signaled, the channel information may be estimated with a high level of accuracy while reducing feedback overhead.

First, since valid values of the channel information affect the position and the range according to a property of a transform matrix (e.g., a discrete Fourier transform (DFT) or orthogonal basis), the UE and the eNB may be indicated/configured to share the corresponding information. Alternatively, the transform matrix may be a predefined/configured matrix.

For example, it is assumed that the transform matrixes are expressed as T_1 and T_2 and a channel information matrix is expressed as X (M by K). In this case, a transformed matrix $\bar{X}$ may be expressed as $\bar{C}=T_1^H X T_2$.

CSI feedback valid range configuration information may classify the operation according to an estimation scheme indicated by the UE or eNB based on channel information transformed through the transform matrix information.

Moreover, as mentioned above, in the case of estimation of the channel information in the massive MIMO environment, characteristics are determined by a main angle and a support range (i.e., support region) for a signaling path between the eNB and the UE.

Accordingly, the sparsity characteristics are intended to be enhanced by estimation of a more accurate angle and reducing the size of the support range by performing a spatial rotation operation in addition to transformation such as a DFT operation. Channel information to which the DFT operation and spatial rotation are applied may be configured as shown in Equation 6 below.

$$h_k \sum_{i=1}^{S} \beta_{k,j} \Phi(\phi_k) a(\theta_{k,i}) \quad \text{[Equation 6]}$$

In Equation 6, $\beta_{k,i}$ represents a complex gain of the corresponding sub-channel, $$\Phi(\phi_k) = \text{diag}\{[1, e^{j\phi_k}, \ldots, e^{j(N_T-1)\phi_k}]\}$$

represents a spatial rotation matrix, and $$\phi_k \in \left[-\frac{\pi}{N_T}, \frac{\pi}{N_T}\right]$$

represents a spatial rotation parameter.

In this case, $a(\theta)$ as an array manifold vector is affected by an antenna structure. In particular, Uniform Linear Array (ULA) shows a form of $$a(\theta) = \left[1, e^{j\frac{2\pi d}{\lambda}\sin\theta}, \ldots, e^{j\frac{2\pi d}{\lambda}(N_T-1)\sin\theta}\right]^T,$$

d represents a spacing between antennas, and λ represents a wavelength of a signal.

Further, S $a(\theta_{k,i})$ s represent sub-channels in a beam-space and are orthogonal to each other. As an example, in a ULA environment, $a(\theta_{k,i})$ may be a specific column of a DFT matrix.

Therefore, in order to more effectively reflect the characteristics of the channel through spatial rotation, an operation of optimizing the value of the spatial rotation parameter may be required. Detailed matters related thereto will be described in more detail in Method 1-2) proposed in the present disclosure.

In the case of channel quantization information, a complex value which is an element of a channel matrix may be mapped to a specific value in a 2-dimensional region of real/imaginary and transformed into an index corresponding thereto. In this case, a quantization degree of a mapping value may be adjusted according to a signal strength and/or order. Further, quantization degrees of the magnitude and the angle may be adjusted according to a specific reference by calculating the magnitude and the angle of the complex value and then, quantizing each of the magnitude and the angle.

For example, when the number of bits allocated to quantization of one complex value is 10, 5 bits may be equally allocated according to each of the magnitude and the angle or allocated at a ratio of 7:3. Alternatively, when only a real value is provided, a method for quantizing a maximum size of the corresponding element only with the real value may also be considered.

When the valid region (or valid range) for the channel information is configured and element-by-element feedback is performed for a plurality of elements in the corresponding valid region, index information for each element in the valid region may be included in each feedback value or omitted. When the index information is omitted, the UE may continuously transmit information of the corresponding information to the eNB without the index information of the valid element.

That is, the UE may be configured to map the corresponding channel information in a transmission direction and a transmission order promised with the eNB and report the corresponding integer to the eNB. Alternatively, the UE may bundle specific elements for a plurality of elements and feed back the bundled elements as one index. In other words, the UE may perform element group-by-element group based feedback and even in this case, index information for the element group may be included or omitted by the scheme described above.

Reporting of positional information for the valid region or values of the corresponding elements, which is performed by the UE, may be performed based on a short-term scheme which is a scheme of performing measurement for a time domain or a frequency domain for each channel. Alternatively, the corresponding reporting may be performed based on a long-term scheme having a specific duration as an interval. That is, the UE may perform measurement and/or reporting of the information by the same unit as implicit based CSI reporting of the UE (e.g., subband and/or wideband of the LTE system).

In this case, reporting of positional information for a significant region (i.e., the specific region or valid region) may be performed by a scheme of reporting the entire corresponding information. Alternatively, when there is legacy positional information, the UE may report the positional information to the eNB in a differential (difference) form of reflecting change degrees of the position and the range of the significant element with legacy information.

For example, when a position (i.e., a center point of the valid region) of the valid region is (51,77) in a specific channel matrix (e.g., 100×100 matrix), the UE and the eNB may be configured to share a region of 5×5 as information on the valid region of the channel around the corresponding position. In this case, when results of the position and the range of the valid region through next DL channel measurement are (60, 70) and 3×7, the UE reports the corresponding value itself to the eNB through signaling or reports position change (+9,−7) and range change (−2,+2) which are differential information to the eNB to correct the differential information with new position and range information for the valid region.

Since the proposed method requires an explicit value of the channel information, a method for promising a rank indicator (RI) or a channel quality indicator (CQI) in implicit CSI feedback not to be reported or pre-configuring the RI or CQI may also be considered. Alternatively, the eNB may calculate the RI and the CQI by using a precoding matrix index (PMI) calculated based on a performance aspect or a predetermined (or configured) precoder (e.g., subband and/or wideband precoder). Further, the eNB may calculate the CQI and/or RI by using the number of significant eigenvalues and corresponding eigenvalues for channel information 3 described above.

Further, since the explicit CSI feedback has high accuracy of the channel information, the explicit CSI feedback may be used in a system in which the transmission/reception technique capable of enhancing non-linear precoding and/or system performance operates. However, to this end, a high UE capability may be required. Accordingly, the priority of CSI feedback may be configured according to service support requirements of the UE and the eNB. As an example, the CSI feedback priority of the UE may be configured in the order of explicit CSI feedback >type II CSI feedback >type 1 CSI feedback. Alternatively, the CSI feedback priority of the UE may be configured in the order of CSI-RS resource indicator (CRI)/RI >explicit CSI feedback >PMI >CQI.

Method 1-1)

In this case, the eNB may make configuration information for DL CSI feedback, to be configured for the UE, to include following one or more information.

Configuration information for an averaging window for a channel estimation value DL channel characteristic information Configuration information for a feedback channel valid region For example, the configuration information for the averaging window for the channel estimation value may be a window interval T value, an M value when averaging estimation values of T times, etc. Further, DL channel characteristic information may be strong AoD(s) and an AoD support range(s) which is a range of an angular region having significant energy therearound, signal strength information in corresponding AoD, signal selection number information LE, etc. In addition, the configuration information for the feedback channel valid region may be a center point position(s) of the channel valid region, a range(s) of the valid region, etc.

Specifically, configuration information related to the channel estimation value (i.e., configuration information for the averaging window for the channel estimation value) will be described in detail.

First, the eNB may transmit the Channel State Information-Reference Signals (CSI-RSs) which are consecutive for a specific number of times T in the time domain and/or the frequency domain. In this case, the UE may be instructed to transform the remaining elements except for elements exceeding a (pre-configured) threshold value to 0 for T sample covariance matrixes obtainable through the CSI-RSs (by the eNB).

As an example, a method for defining a region where the indexes of non-zero values overlap M (≤T) or more as R_mean and configuring R_mean through the minimum rectangular region that includes the region or channel valid region configuration information indicated by the eNB may be considered. When the UE feeds back (i.e., reports) the calculated R_mean region to the eNB, the UE may transmit all indexes in the corresponding region or instruct the feedback by configuring a horizontal and/or vertical range based on a specific index. Thereafter, for a specific number of times from a T+1-th CSI-RS, remaining elements other than the channel covariance matrix in the UE may be transformed to 0.

Alternatively, in order for the eNB to acquire DL channel characteristic information proposed in the present disclosure, the eNB may calculate AoD of a DL channel and the AoD support region which is a region having significant energy around the corresponding AoD based on the UL channel by using a method such as UL-DL angular reciprocity and then, notify the calculated AoD and AoD support region to the UE.

Based on the AoD and the corresponding support region information, a position for a specific element of the channel matrix and a specific range based thereon may be configured. Here, the specific range may have a radius having a value of R or may be determined as an R×R region around the position of the specific element.

Alternatively, the range for the specific region may be configured through the valid region configuration information indicated by the eNB. Alternatively, importance information (e.g., signal strength or a range of a significant region) for a specific region generated by channel sparsity may be utilized.

That is, by measuring the signal strength at the specific position, the number of significant specific element positions and the magnitude of R centering on the corresponding position may be transformed through adjustment. For example, for five significant components of a specific channel and magnitude information of the corresponding values, a position having a specific magnitude value or more configured from the eNB and the range at the corresponding position may be configured as the significant channel region. In addition, by arranging the magnitude values of the components in descending order, a significant channel region may be differentially configured based on L components starting with the largest value according to the number value L configured by the eNB. Through such signaling, the eNB and the UE may share a region for a valid value of the DL channel with each other.

Based thereon, the remaining elements outside the designated range of the channel covariance matrix at the UE may be transformed to 0.

Hereinafter, two examples show examples of a DL CSI feedback configuration using information which the eNB may configure for the UE. A first example may correspond to a case of using the averaging window for the channel estimation value and a second example may correspond to a case of utilizing the DL channel characteristic information.

(First Example)

First, a scheme based on the channel estimation value will be described.

In the corresponding example, it is assumed that the window interval (that is, the number of estimation times) T is 10, a value M when averaging T estimation values is 7, the number of components configured by the eNB (i.e., signal strength selection number) L is 3, and a range R of the valid region is configured to {15, 12, 10}.

When using the above-described channel information 2, the UE may apply a pre-promised transformation matrix to 10 sample covariance matrixes obtained through 10 CSI-RSs transmitted from the eNB. The corresponding UE may configure the corresponding elements to 0 if the elements of each sample covariance matrix transformed accordingly do not exceed a specific value. Thereafter, the UE averages regions in which non-zero element values overlap at least 7 times among 10 matrixes and the magnitudes of the corresponding element values. The UE may search for the valid range of the channel by configuring the minimum rectangular regions including the corresponding elements and finally determine the valid channel range through the upper signal strength selection number L configured by the eNB and the range R of the corresponding region.

That is, the corresponding region based on the value of the element having the largest signal strength may be configured to 15×15 and the sizes of the region for next large elements may be configured to 12×12 and 10×10. Alternatively, in the case of the above-described channel information 3, the UE may obtain the corresponding information by eigen-decomposition after applying the transform matrix to 10 measured channel matrixes. Thereafter, the UE may finally determine a valid feedback channel through a value obtained by accumulating L upper eigenvalue(s) and eigenvector(s) corresponding thereto as specific numbers by utilizing information of L and then averaging the specific numbers.

(Second Example)

Next, an example for a scheme based on the DL channel characteristic will be described.

In the corresponding example, it is assumed that the number of components (i.e., the number of signal strength selections) L configured by the eNB is 3 and {AoD_i, range_i, R_i} (i is 1 to L).

When using the above-described channel information 2, the eNB applies the UL-DL angle reciprocity based on the UL channel through a reference signal (i.e., UL reference signal) of the UE to calculate the AoD of the DL channel and the AoD support region which is a range having a significant channel size value based on the corresponding AoD. In this case, the eNB may determine AoD_i and range_i corresponding to top L by arranging the channel size values in each AoD in descending order, and then report the determined AoD_i and range_i to the UE. Thereafter, the UE may configure a position and a corresponding range of a significant element for channel information 2 through a specific mapping scheme of information reported from the eNB and the channel information.

That is, similarly to the scheme described in the first example, the valid range may have a radius having a value of R centering on the specific element or may be determined as an R×R region. Alternatively, the UE may determine the corresponding range by using the R_i value reported by the eNB. Alternatively, in the case of channel information 3, the UE reports, to the eNB, eigenvector(s) satisfying a scheme (e.g., inner product) that may measure a similarity for reported AoD_i and a direction of an eigenvector(s) at a specific level, and a corresponding eigenvalue(s) to calculate the valid feedback channel.

Method 1-2)

The UE that receives the configuration information for the DL CSI feedback as described above may report the CSI to the eNB by using one or more of the CSI feedback configuration information.

In this case, the UE may report, to the eNB, the configuration information for the valid region of the channel. When the UE reports the corresponding configuration information to the eNB, the reported information may include a position/range designation value of a channel component, the magnitude of a channel component value, and sequence information.

Specifically, the method in which the UE that receives the configuration information for the DL CSI feedback reports the CSI to the eNB will be described in detail.

The UE may configure the channel information from a reference signal (e.g., CSI-RS) and designate or determine the position and the range of a channel element to be fed back by utilizing the channel valid region information indicated by the eNB. In this case, the UE may transmit an element value to the eNB through a quantization scheme proposed with the eNB or a mapping scheme with a feedback index. Therefore, the eNB may configure the DL channel based on the information received from the UE.

As described above, when the UE operates by utilizing the configuration information for (DL) CSI feedback, the UE may designate (or configure) valid position information and range information of the channel information and transmit the designated valid position information and range information to the eNB. Alternatively, the UE may transmit magnitude information for the channel component value and L which is upper number selection information for the magnitude. In this case, the corresponding position and range may be calculated through a channel estimation scheme indicated by the eNB. Here, the specific range may have a radius having a value of R or may be determined as an R×R region or a predetermined rectangular region around the position of the specific element. For a region outside the size of a channel information matrix for region R at a designated position, the range may be configured by excluding a portion corresponding to the region.

As mentioned in method 1-1) described above, the UE may notify, to the eNB, L which is a valid region configuration number of the DL channel. Alternatively, the UE may report, to the eNB, information on a component of a channel having a specific signal strength or more after the quantization operation according to the scheme.

In this case, in regard to the reporting of the corresponding information, the UE may measure or report the information in the same unit as performing implicit based CSI reporting for the time domain/frequency domain by the UE.

The eNB and the UE share such information to predetermine the position of the feedback element, thereby reducing the feedback overhead.

In the case of the method(s) proposed in the embodiment, a scheme of feeding back the channel (i.e., information on the channel state, CSI) by using AoD, AoA, etc., based on 2 dimension (2D) channel modeling is described, but the corresponding method(s) may be applied even to a channel which is extended to 3 dimension (3D) channel modeling and considers zenith angles of departure (ZoD), zenith angles of Arrival (ZoA), etc., of course.

FIG. 16 illustrates an example of a signaling procedure between an eNB and a UE for CSI feedback to which an embodiment proposed in the present disclosure is applicable. FIG. 16 is just for convenience of the description and does not limit the scope of the present disclosure.

Referring to FIG. 16, it is assumed that the UE and the eNB operate based on the methods described in the first embodiment described above. That is, a procedure illustrated in FIG. 16 represents a method for reducing the CSI feedback overhead by using the channel sparsity. A specific procedure for the method for utilizing the channel covariance matrix is as follows.

First, the eNB may measure (or calculate) UL channel information (e.g., UL channel matrix, a power-angle spectrum, etc.) through UL pilot transmission of the UE (S1605). Here, the UL pilot transmission may mean that the UE transmits a UL reference signal to the eNB by the UE in order to measure the UL channel. Thereafter, the eNB may transmit the UL channel information (that is, UL channel estimation information) to the UE (S1610).

The UE may measure DL channel information based on the UL channel information received from the eNB and configure a covariance matrix C which is channel information to be fed back to the eNB (S1615).

In this case, when UL-DL channel reciprocity is not established, steps S1605 and S1615 described above may be omitted. In this case, the UE may measure the DL channel information through a DL reference signal received from the eNB and configure the channel information.

The UE multiplies a left side and a right side of the configured covariance matrix by hermitian of the transform matrix and the transform matrix to generate (or configure) an M1 matrix (S1620).

Further, the UE may generate an M2 matrix by applying the scheme of configuring the valid region of the channel for the generated M1 matrix (S1625). In this case, a method for configuring the channel valid region may be as in the following examples.

For example, with regard to the configuration of the channel valid region, the UE may be configured to transform the remaining elements other than largest L (here, L means L mentioned above and means the number of configured valid regions for the DL channel) elements in each element size value of the M1 matrix to 0.

As another example, with regard to the configuration of the channel valid region, the UE may be configured to transform the remaining elements other than an element which exceeds a specific threshold value in each element size value of the M1 matrix to 0.

As yet another example, with regard to the configuration of the channel valid region, the UE may configure (or determine) a position for a specific element of the M1 matrix and a specific range based thereon by using AoD and information on the corresponding support region and may be configured to transform the remaining elements to 0. Here, the specific range may have a radius having a value of R or may be determined as an R×R region around the position of the specific element. Further, the UE may perform the transform operation through adjustment for a specific element position number according to a dominant path L or a signal strength order and/or adjustment for the size of R centering on the corresponding position.

As still yet another example, with regard to the configuration of the channel valid region, a scheme may be applied, in which the UE transforms the remaining elements other than the element which exceeds the specific threshold value to 0 from the M1 matrixes acquired through CSI-RSs which are consecutive for a specific number of times T and defines a region where indexes of non-zero values overlap M (≤T) times as R_mean. The minimum rectangular region including the corresponding region may be configured as R_mean. In this case, for a specific number of times from a T+1-th CSI-RS, the UE may be configured to transform the remaining elements other than R_mean of the M1 matrix to 0.

Further, the UE may generate an M3 matrix by performing quantization for the generated M2 matrix (S1625). In this case, the quantization may be as in the following examples.

For example, the UE may be configured to map a complex value which is an element of the M2 matrix in the 2 dimension region of real/imaginary to a specific value and change the mapped specific value to an index corresponding thereto. In this case, a mapping quantization degree may be adjusted according to the order of a specific reference (e.g., dominant path or signal).

As another example, the UE may be configured to calculate the magnitude and the angle of the complex value which is the element of the M2 matrix and then quantize and transform each of the calculated magnitude and angle. In this case, the mapping quantization degree may be adjusted according to the order of the specific reference (e.g., dominant path or signal). As an example, when the number of bits required for quantization of one complex value is 10, 5 bits may be equally allocated according to each of the magnitude and the angle or a bit number may be allocated at a ratio of 7:3.

As another example, the UE may be configured to quantize a maximum element size only with a real value when the value of the element has only the real value.

Thereafter, the UE may transmit (or report) the generated M3 matrix value included in feedback information to the eNB (S1635). For example, the UE may quantize the value of the M3 matrix and the index and transfer the quantized M3 matrix value and index to the eNB. As another example, the UE share the position of the specific element and a specific sequence scheme which is fed back through signaling between the eNB and the UE for the value of the M3 matrix to transfer the complex value(s) to the eNB.

Thereafter, the eNB may recover the M3 matrix through a recovery operation for the feedback information transmitted from the UE and derive the channel information based thereon (S1640). As an example, the recovery operation may be an operation of mapping the index and the complex value which are fed back to a matrix constituted by C and 0 having the same size or sequentially recovering the M3 matrix by utilizing the valid region of the M3 matrix and a specific sequence scheme defined the UE and the eNB.

In such a procedure, like the above-described method, the eNB may notify, to the UE, L (i.e., the valid region configuration number of the channel) which is channel sparsity information. Alternatively, according to the scheme, the UE may report, to the eNB, L detected after the quantization operation (e.g., S1630). The UE and the eNB share an L value (that is, share a procedure of not reporting the entire elements for the channel but reporting only some valid element(s)) to predetermine a feedback index and reduce feedback overhead through the predetermined feedback index.

As mentioned above, the scheme of feeding back the channel (i.e., the information on the channel state, CSI by using AoD, AoA, etc., based on the 2D channel modeling is described, but such a procedure may be applied even to a channel which is extended to the 3D channel modeling and considers ZoD, ZoA, etc., of course.

A performance result when applying the method proposed in the embodiment will be described.

In this case, it is assumed that the UE intends to transfer the DL channel covariance matrix to the eNB. Further, digital feedback for explicit CSI feedback may be considered. That is, it is assumed that the channel information is transferred in a payload form through the feedback channel.

Further, when the numbers of antenna ports in the eNB and the UE are configured as N_T and N_R, respectively, the channel matrix and the corresponding covariance matrix may be shown in Table 11.

TABLE 11

Channel matrix $H \in C^{N_R \times N_T}$
Channel covariance matrix $H^H H \in C^{N_T \times N_T}$
(when the channel covariance matrix is fed back, a maximum complex value feedback information amount considering Hermitian symmetry is $\frac{N_T^2 + N_T}{2}$.)

In this case, the feedback overhead according to embodiments of the channel covariance matrix C may be shown in Table 12.

TABLE 12

| | B = 10 / # of AoD = 3 / region size = 225 (15 × 15) | | |
|---|---|---|---|
| Overhead bits | $N_T = 50$ | $N_T = 70$ | $N_T = 90$ |
| Scheme #1 | 18300 | 32400 | 40950 |
| Scheme #2 | 14175 | 14175 | 14850 |
| Scheme #3 | 2283 | 2286 | 2286 |
| Overhead gain over #1 / #2 | 8.01   6.21 | 14.2   6.20 | 17.9   6.50 |

Scheme #1
Overhead size: $\frac{N_T^2 + N_T}{2} \times B$
Scheme #2
Overhead size: (# of effective values ≅ region size) × (index overhead) × B
Scheme #3
Overhead size: (# of AoD) × (region size) × B bits In Table 12, scheme #1 means a scheme of feeding back all complex values assuming the Hermitian symmetry. Further, scheme #2 means an index corresponding to a case where a gain of the complex value exceeds a specific value (e.g., a preconfigured threshold value) and a value thereof. In addition, scheme #3 may mean a scheme (i.e., the scheme described above in the embodiment) considering AoD and the corresponding support region.

When an overhead value measured in the case of scheme #3 is considered, it can be seen that the scheme proposed in the embodiment may be efficiently applied in the CSI feedback.

Second Embodiment

In the method proposed in the present disclosure, the UE and/or the eNB is capable of significantly reducing the feedback overhead for acquiring the channel information in the DL by utilizing a low-rank characteristic of the channel information based on sparsity of the massive MIMO radio channel environment.

In order to perform the method, estimating and utilizing angular information of the channel corresponding to the low-rank may be requested. A scheme such as legacy multiple signal classification (MUSIC), estimation of signal parameters via rotational invariance technique (ESPRIT), etc., has limitations in that high complexity is incurred in a massive antenna environment and characteristics of input signals are not normally reflected.

Accordingly, through performing signal processing and DFT operations based on an antenna array, the angular information in the massive MIMO environment may be efficiently acquired and utilized for channel estimation. Here, a (p, q)-th element of DFT matrix F may be configured as follows.

$$[F]_{p,q} = \frac{1}{\sqrt{N_T}} e^{-i \frac{2\pi}{N_T}(p-1)(q-1)} \text{ for } p, q = 1, \ldots, N_T \quad \text{[Equation 7]}$$

In Equation 7, N_T represents the number of antenna ports of a transmitting device (e.g., eNB).

That is, the resolution of DFT may be greatly enhanced due to a massive antenna configuration (e.g., N_T»1) of a transmitting end and it may be possible to estimate the angle and the angular spread of the signal with comparatively high accuracy through the DFT operation.

For example, in a ULA environment, the DFT operation transforms the channel information to sub-channels configured at a uniform interval in an entire beam-space. In this case, points (or positions) having non-zero values may be construed as the angular spread centering on specific direction of arrival (DoA) of the channel. In a wireless environment considered in the present disclosure, it is assumed that the number of sub-channels is limited, and the sub-channels are dense and sparse.

On the other hand, in terms of practical implementation, the number of antennas at the transmitting end is finite, which may limit the resolution of the DFT. In this case, power for each sub-channel may lead to an outflow to an adjacent sub-channel, so that the number of sub-channel powers other than 0 may be increased compared to when the DFT resolution is high. This weakens the sparsity of the channel to cause a burden on the channel information feedback of the UE.

Considering such a point, a method may be considered, which reduces power outflow of the sub-channels by aligning the direction of the sub-channels and an incoming signal with higher accuracy by performing spatial rotation of a radio channel.

As an example, a sparsity effect of the channel through the spatial rotation and DFT operation may be illustrated in FIG. 17.

FIG. 17 illustrates an example of a channel sparsity effect to which spatial rotation and DFT operations are applied, to which an embodiment proposed in the present disclosure is applicable. FIG. 17 is just for convenience of the description and does not limit the scope of the present disclosure.

Referring to FIG. 17, in the case of the legacy DFT operation, 28 sub-channels are expressed as the channel information, while when the spatial rotation is additionally performed, 11 sub-channels may be expressed.

Hereinafter, in the embodiment, a method for additionally optimizing application of the spatial rotation in performing the explicit CSI feedback by utilizing the characteristics of the channel as described above (e.g., the aforementioned first embodiment) will be described in detail.

The method(s) described in the embodiment may be associated with the methods of the first embodiment and may be considered as an additional method(s) according to optimization of the application of the spatial rotation.

Method 2)

First, through specific signaling (e.g., RRC signaling, MAC-CE, DCI, etc.) between the UE and the eNB, positional information of elements corresponding to a specific region of channel information (e.g., sparse channel covariance matrix) and/or corresponding values may be configured to be fed back. As an example, the specific region may refer to a region where the valid information (or element) of the channel covariance matrix is concentrated and distributed due to sparsity characteristics.

In this case, the UE may be configured to report the positional information and the corresponding values in a long-term or a short-term Further, when there is legacy reported positional information, the corresponding positional information may be reported by a differential scheme of feeding back only difference information from previously reported information.

Hereinafter, the scheme will be described in more detail.

The present disclosure proposes a method for utilizing channel sparsity in the considered system situation in order to reduce CSI feedback overhead.

In this case, a meaningful value of the channel information according to channel sparsity may have a feature of concentration in the specific region. Here, the meaningful channel information may mean information in which the size of the corresponding channel information element is equal to or greater than a specific reference value. Therefore, if the channel estimation method between the eNB and the UE and the channel characteristic information are determined and only the channel information having a significant value, not the entire channel information is signaled, the channel information may be estimated with a high level of accuracy while reducing feedback overhead.

First, since valid values of the channel information affect the position and the range according to a property of a transform matrix (e.g., a discrete Fourier transform (DFT) or orthogonal basis), the UE and the eNB may be indicated/configured to share the corresponding information. Alternatively, the transform matrix may be a predefined/configured matrix.

For example, it is assumed that the transform matrixes are expressed as T_1 and T_2 and the channel information matrix is expressed as X (M by K). In this case, the transformed matrix $\bar{X}$ may be expressed as $\bar{C}=T_1^H X T_2$.

CSI feedback valid range configuration information may classify the operation according to an estimation scheme indicated by the UE or eNB based on channel information transformed through the transform matrix information.

Moreover, as mentioned above, in the case of estimation of the channel information in the massive MIMO environment, characteristics are determined by a main angle and a support range (i.e., support region) for a signaling path between the eNB and the UE.

Accordingly, the sparsity characteristics are intended to be enhanced by estimation of a more accurate angle and reducing the size of the support range by performing a spatial rotation operation in addition to transformation such as a DFT operation. Channel information to which the DFT operation and spatial rotation are applied may be configured as shown in Equation 8 below.

$$h_k = \sum_{i=1}^{S} \beta_{k,i} \Phi(\phi_k) a(\theta_{k,i})$$ [Equation 8]

In Equation 8, $\beta_{k,i}$ represents a complex gain of the corresponding sub-channel, $\Phi(\phi_k)=\text{diag}\{[1, e^{j\phi_k}, \ldots, e^{j(N_T-1)\phi_k}]\}$ represents a spatial rotation matrix, and $$\phi_k \in \left[-\frac{\pi}{N_T}, \frac{\pi}{N_T}\right]$$

represents a spatial rotation parameter.

In this case, $a(\theta)$ as an array manifold vector is affected by the antenna structure. In particular, in the case of Uniform Linear Array (ULA), a form of $$a(\theta) = \left[1, e^{j\frac{2\pi d}{\lambda}\sin\theta}, \ldots, e^{j\frac{2\pi d}{\lambda}(N_T-1)\sin\theta}\right]^T$$

is shown, d represents the spacing between the antennas, and $\lambda$ represents a wavelength of the signal.

Further, S $a(\theta_{k,i})$ s represent the sub-channels in the beam-space and are orthogonal to each other. As an example, in the ULA environment, $a(\theta_{k,i})$ may be a specific column of the DFT matrix.

Therefore, in order to more effectively reflect the characteristics of the channel through spatial rotation, an operation of optimizing the value of the spatial rotation parameter may be required. Detailed matters related thereto will be described in more detail in Method 2-2) proposed in the present disclosure.

Method 2-1)

In this case, the eNB may make configuration information for DL CSI feedback, to be configured for the UE, to include following one or more information.

Configuration information for an averaging window for a channel estimation value DL channel characteristic information Configuration information for a feedback channel valid region For example, the configuration information for the averaging window for the channel estimation value may be a window interval T value, an M value when averaging estimation values of T times, etc. Further, DL channel characteristic information may be strong AoD(s) and an AoD support range(s) which is a range of an angular region having significant energy therearound, signal strength information in corresponding AoD, signal selection number information LE, etc. In addition, the configuration information for the feedback channel valid region may be a center point position(s) of the channel valid region, a range(s) of the valid region, an index(es) for a promised region configuration, etc.

Further, with regard to the DL channel characteristic information, when the eNB supports multiple UEs, the configuration information for the DL CSI feedback may additionally include group information according to overlap of AoD and the corresponding support range.

Specifically, configuration information related to the channel estimation value (i.e., configuration information for the averaging window for the channel estimation value) will be described in detail.

First, the eNB may transmit the Channel State Information-Reference Signals (CSI-RSs) which are consecutive for a specific number of times T in the time domain and/or the frequency domain. In this case, the UE may be instructed to transform the remaining elements except for elements exceeding a (pre-configured) threshold value to 0 for T sample covariance matrixes obtainable through the CSI-RSs (by the eNB).

As an example, a method for defining a region where the indexes of non-zero values overlap M ($\leq$T) or more as R_mean and configuring R_mean through the minimum rectangular region that includes the region or channel valid region configuration information indicated by the eNB may be considered. When the UE feeds back (i.e., reports) the calculated R_mean region to the eNB, the UE may transmit all indexes in the corresponding region or instruct the feedback by configuring a horizontal and/or vertical range based on a specific index. Thereafter, for a specific number of times from a T+1-th CSI-RS, remaining elements other than the channel covariance matrix in the UE may be transformed to 0.

Alternatively, in order for the eNB to acquire DL channel characteristic information proposed in the present disclosure, the eNB may calculate AoD of a DL channel and the AoD support region which is a region having significant energy around the corresponding AoD based on the UL channel by using a method such as UL-DL angular reciprocity and then, notify the calculated AoD and AoD support region to the UE.

Further, when the eNB considers or supports multiple UEs, the corresponding eNB may indicate the operation of the UE or signaling by utilizing the angular information for each UE.

In particular, in an environment supporting multiple UEs, the UE (i.e., user) may be grouped through the AoD of each UE and whether the support region corresponding thereto overlaps. Such grouping may be utilized for a pilot/training sequence configuration, a CSI feedback scheme configuration, etc., by various schemes. Here, a pilot/training sequence may mean a sequence for a UL signal which the UE transmits to the eNB in order to estimate and measure UL channel information.

First, with respect to the pilot/training sequence configuration, the eNB may group UE having similar AoD and angular spread overlap through angular information calculated based on the UL channel information of the UEs. In this case, UEs in the same group are configured to use an orthogonal pilot/training sequence, and the aforementioned sequences may be utilized to be reused for other groups. Accordingly, a pilot contamination problem may be alleviated while reducing overhead in a system operation.

Alternatively, based on the calculated angular information, the eNB may indicate the CSI feedback scheme differently in an explicit or implicit method according to the group. As an example, it is assumed that two of three UEs to be supported by the eNB have AoD and angular spread similar to each other, so that overlap occurs in the angular domain, and the overlap does not occur in the other one. In this case, in terms of facilitating interference control between two UEs where the overlap occurs, the two UEs are configured or instructed (by the eNB) to perform explicit CSI feedback, and the other UE may be configured or instructed (by the eNB) to report the channel information in the explicit or implicit method.

Further, by using the AoD and the corresponding support region information, the position for the specific element of the channel matrix and the specific range based thereon may be configured. The specific range may have a radius having a value of R or may be determined as an R×R region around the position of the specific element. Alternatively, by designating pre-promised (or defined) regions as indexes, the corresponding specific range region may be configured based on a coefficient position of the channel covariance matrix reported by the UE.

FIG. 18 illustrates an example of a valid region of channel information and an index for each valid region to which an embodiment proposed in the present disclosure is applicable. FIG. 18 is just for convenience of the description and does not limit the scope of the present disclosure.

As illustrated in FIG. 18, it is assumed that the UE and the eNB share 10 promised regions numbered from 1 to 10 in advance.

In this case, if the valid coefficient position of the channel covariance matrix is (i, j), the corresponding position may correspond to any one of regions 1802 expressed in FIG. 18, and based thereon, the UE may determine a specific range region as the valid range. Thereafter, the UE may sequentially feed back actual complex values included in the valid range according to a preconfigured order.

As a specific example related thereto, a method for configuring or determining the valid region by utilizing a region and an index which are pre-promised in a channel covariance matrix having an eNB antenna number of 36 (i.e., N_T=36) will be described.

FIG. 19 illustrates a specific example of configuring the valid region of the channel information to which an embodiment proposed in the present disclosure is applicable. FIG. 19 is just for convenience of the description and does not limit the scope of the present disclosure.

Referring to FIG. 19, it is assumed that the valid region of a sparse channel covariance matrix configured to 36×36 is configured. This is only an example and may be applied in the same way even when the size of the channel covariance matrix is different, of course.

In this case, a scheme may be considered, in which after expressing the position with the valid coefficient of the channel covariance matrix as 'O', a rectangular region including the corresponding area is assumed, but a position where the valid coefficient is not included is expressed as '#' and classified.

When the rectangular regions are configured through such a scheme, three rectangles may be generated as illustrated in FIG. 19. In this case, the channel covariance matrix is symmetric, and coefficients may be distributed in a rectangular/circular/cross shape starting from the center of each valid region.

Therefore, a pre-defined region including the most valid positions may be applied and configured based on the center position of each rectangle. When the valid region outside the configured region remains, the region may be configured by configuring the index in the pre-defined region in the same method based on the top, bottom, left, and right of a reference position.

In addition, a priority and a quantization level may be adjusted according to feedback overhead and a level of accuracy required. That is, the most important valid regions in the recovery of the channel covariance matrix may be information corresponding to a central portion in each rectangular region. Accordingly, in terms of overhead reduction, the UE may be configured to feed back [Position:(8, 8)/index: 3], [Position:(25,7)/index:6], [Position:(25,26)/index:3], and only coefficients corresponding thereto. Upon feedback of the coefficient, the UE may process a portion indicated by '#' in the corresponding region as a value of 0. Alternatively, in terms of accuracy, the UE may be configured to perform a feedback operation utilizing a position including the entire valid region and the index by using a pre-defined region.

Further, with respect to coefficient quantization, it may be possible to adjust the trade-off between the performance and the feedback overhead by equally taking or differentially giving the quantization level of a middle region and an outer region.

Method 2-2)

The UE that receives the configuration information for the DL CSI feedback may report the CSI to the eNB by using one or more of the CSI feedback configuration information.

In this case, the UE may calculate the spatial rotation parameter and report the calculated spatial rotation parameter to the eNB. Further, the UE may report, to the eNB, the configuration information for the valid region of the channel. When the UE reports the corresponding configuration information to the eNB, the reported information may include a position/range designation value of a channel component, the magnitude of a channel component value, and sequence information.

Specifically, the method in which the UE that receives the configuration information for the DL CSI feedback reports the CSI to the eNB will be described in detail.

The UE may configure the channel information from a reference signal (e.g., CSI-RS) and designate or determine the location and the range of a channel element to be fed back by utilizing the channel valid region information indicated by the eNB. In this case, the UE may transmit an element value to the eNB through a quantization scheme proposed with the eNB or a mapping scheme with a feedback index. Therefore, the eNB may configure the DL channel based on the information received from the UE.

As described above, when the UE operates by utilizing the configuration information for (DL) CSI feedback, the UE may designate (or configure) valid location information and range information of the channel information and transmit the designated valid location information and range information to the eNB. Alternatively, the UE may transmit magnitude information for the channel component value and L which is upper number selection information for the magnitude. In this case, the corresponding location and range may be calculated through a channel estimation scheme indicated by the eNB. Here, the specific range may have a radius having a value of R or may be determined as an R×R region or a predetermined rectangular region, or an index (e.g., FIG. 18) for a valid region pre-promised (or configured) with the eNB. For a region outside the size of a channel information matrix for region R at a designated position, the range may be configured by excluding a portion corresponding to the region.

As mentioned method 2-1) described above, the UE may notify, to the eNB, L which is a valid region configuration number of the DL channel. Alternatively, the UE may report, to the eNB, information on a component of a channel having a specific signal strength or more after the quantization operation according to the scheme.

Further, as mentioned above, the UE may configure a spatial rotation parameter for reducing the feedback overhead by further enhancing the sparsity of the channel information in addition to the DFT operation, and report the configured spatial rotation parameter to the eNB. The eNB may recover actual channel information by utilizing the spatial rotation parameter value transferred from the UE for the spatial rotation matrix pre-promised by the eNB and the UE.

For example, prior to configuring the channel covariance matrix C to be fed back by utilizing the CSI-RS(s) received by the UE, the UE may autonomously preconfigure the spatial rotation parameter $$\left(\phi_{iter} \in \left[-\frac{\pi}{N_T}, \frac{\pi}{N_T}\right]\right)$$

with a specific resolution or by a designated scheme. As a more specific example, a channel covariance matrix C' to which a spatial rotation $\Phi(\phi_{iter})$ and a DFT operation F are applied based on each configured spatial rotation parameter value may be shown in Equation 9 below.

$$C'(\phi_{iter}) = \Phi(\phi_{iter})FCF^H\Phi(\phi_{iter})^H \quad \text{[Equation 9]}$$

In this case, coefficients which are equal to or more than a specific threshold value in the modified channel covariance matrix(es) are assumed as valid values. The UE may detector calculate a spatial rotation parameter $\phi_{iter}^{opt}$ in which the number of valid coefficients is smallest through a one-dimension search. Further, the UE reports the spatial rotation parameter value even to the eNB to configure the eNB and the UE to have the same spatial rotation matrix. Thereafter, eNB may recover the channel covariance matrix C by using the configured spatial rotation matrix.

Alternatively, it is assumed that the eNB may use a global position angle in consideration of both geographical environments of the antenna thereof and the UE and angular information corresponding to a cluster(s) affecting a sparse channel configuration. In this case, the eNB reports the corresponding angular information to the UE, and as a result, the UE may calculate the spatial rotation parameter. Alternatively, after the eNB autonomously calculates the spatial rotation parameter, the eNB reports the value to the UE to configure the channel covariance matrix to be fed back.

In this case, in regard to the reporting of the corresponding information, the UE may measure or report the information in the same unit as performing implicit based CSI reporting for the time domain/frequency domain by the UE.

The eNB and the UE share such information to predetermine the position of the feedback element, thereby reducing the feedback overhead.

In the case of the method(s) proposed in the embodiment, a scheme of feeding back the channel (i.e., information on the channel state, CSI) by using AoD, AoA, etc., based on 2 dimension (2D) channel modeling is described, but the corresponding method(s) may be applied even to a channel which is extended to 3 dimension (3D) channel modeling and considers zenith angles of departure (ZoD), zenith angles of Arrival (ZoA), etc., of course.

In particular, in a shape of ULA considering the legacy antenna array signal processing scheme, a 2D antenna shape (e.g., uniform planar array (UPA)) may be considered. In this case, a channel considering both horizontal and vertical information may be configured and expressed by a Kronecker product as shown in Equation 10 below.

$$h_k = \sum_{i=1}^{S} \sum_{j=1}^{S} \beta_{i,j}^k \Phi(\phi_k^h, \phi_k^v) a(\theta_{k,i}^h, \theta_{k,j}^v)$$ [Equation 10]

Here, a 2D array manifold vector $a(\theta_{k,i}^h, \theta_{k,i}^v)$ and a spatial rotation matrix $\Phi(\phi_k^h, \phi_k^v)$ may be defined as shown in Equation 11 below.

$a(\theta_{k,i}^h, \theta_{k,j}^v) = a_h(\theta_{k,i}^h) \otimes a_v(\theta hd\ k,j^v)$ $\Phi(\phi_k^h, \phi_k^v) = \Phi(\phi_k^h) \otimes \Phi(\phi_k^v)$ [Equation 11]

That is, the 2D array manifold may be configured through each array manifold vector assuming the ULA in horizontal and vertical environments. Further, $\theta_{k,i}^h$ and $\theta_{k,j}^v$ which are horizontal and vertical DoA values may be estimated through the UL channel information.

Similarly thereto, the spatial rotation matrix may also be configured by utilizing a value in a horizontal/vertical angular region. Further, apart from the antenna structure, the spatial rotation matrix may be configured based on N_T 1D or 2D DFT beams or specific orthogonality.

FIG. 20 illustrates an example of a signaling procedure between an eNB and a UE for CSI feedback to which another embodiment proposed in the present disclosure is applicable. FIG. 20 is just for convenience of the description and does not limit the scope of the present disclosure.

Referring to FIG. 20, it is assumed that the UE and the eNB operate based on the methods described in the second embodiment described above. That is, a procedure illustrated in FIG. 20 represents a method for reducing the CSI feedback overhead by applying the DFT operation and the spatial rotation based on the channel sparsity. A specific procedure for the method for utilizing the channel covariance matrix is as follows.

First, the eNB may measure (or calculate) UL channel information (e.g., UL channel matrix, a power-angle spectrum, etc.) through UL pilot transmission of the UE (S2005). Here, the UL pilot transmission may mean that the UE transmits a UL reference signal to the eNB by the UE in order to measure the UL channel. Thereafter, the eNB may transmit the UL channel information (that is, UL channel estimation information) to the UE (S2010).

The UE may measure DL channel information based on the UL channel information received from the eNB and configure a covariance matrix C which is channel information to be fed back to the eNB (S2015).

In this case, when UL-DL channel reciprocity is not established, steps S2005 and S2015 described above may be omitted. In this case, the UE may measure the DL channel information through a DL reference signal received from the eNB and configure the channel information.

The UE multiplies a left side and a right side of the configured covariance matrix by hermitian of the transform matrix and the transform matrix to generate (or configure) an M1 matrix (S2020). In this case, a method for configuring the transform matrix may be as in the following examples.

For example, with respect to the configuration of the transform matrix, a DFT matrix according to the size of the covariance matrix C or a matrix configured based on orthogonality, an arbitrary matrix, and the like may be used.

As another example, in a situation in which the UE and the eNB share a structure Φ of the spatial rotation matrix, the transform matrix may be configured according to the following step.

First, a spatial rotation parameter $$\phi_{iter} \in \left[ -\frac{\pi}{N_T}, \frac{\pi}{N_T} \right]$$

may be quantized with a uniform or specific resolution due to the internal configuration of the UE or the indication by the eNB, and the UE may utilize the value itself for reporting or map the value to the index and indicate the value.

Next, for the covariance matrix C in step S2015, the UE may configure a channel covariance matrix $C'(\phi_{iter}) = \Phi(\phi_{iter}) FCF^H \Phi(\phi_{iter})^H$ by utilizing the DFT matrix F and the spatial rotation matrix Φ. In this case, coefficients which are equal to or more than a specific threshold value at $C'(\phi_{iter})$ may be determined as the valid values.

In this case, coefficients which are equal to or more than a specific threshold value at $C'(\phi_{iter})$ may be determined as the valid values. The UE may calculate an optimal spatial rotation parameter $\phi_{iter}^{opt}$ in which the number of valid coefficients is smallest. $C'(\phi_{iter}^{opt})$ configured by the calculated parameter is an M1 matrix. Moreover, the calculated parameter may be then transferred to the eNB in step S2035 and used for the recovery operation in step S2040.

Further, the UE may generate an M2 matrix by applying the scheme of configuring the valid region of the channel to the generate M1 matrix (S2025). In this case, a method for configuring the channel valid region may be as in the following examples.

For example, with regard to the configuration of the channel valid region, the UE may be configured to transform the remaining elements other than largest L (here, L means L mentioned above and means the number of configured valid regions for the DL channel) elements in each element size value of the M1 matrix to 0.

As another example, with regard to the configuration of the channel valid region, the UE may be configured to transform the remaining elements other than an element which exceeds a specific threshold value in each element size value of the M1 matrix to 0.

As yet another example, with regard to the configuration of the channel valid region, the UE may configure (or determine) a position for a specific element of the M1 matrix and a specific range based thereon by using AoD and information on the corresponding support region and may be configured to transform the remaining elements to 0. Here, the specific range may have a radius having a value of R or may be configured as an R×R region around the position of the specific element. In this case, the UE may perform the transform operation through adjustment for a specific element position number according to a dominant path L or a signal strength order and/or adjustment for the size of R centering on the corresponding position, or a configuration value. Alternatively, the channel valid region may be configured by reporting the index for predefined valid region information centering on the position of the specific element.

As yet another example, with regard to the configuration of the channel valid region, a scheme may be applied, in which the UE transforms the remaining elements other than the element which exceeds the specific threshold value to 0 from the M1 matrixes acquired through CSI-RSs which are consecutive for a specific number of times T and defines a region where indexes of non-zero values overlap M (≤T) times as R_mean. The minimum rectangular region including the corresponding region may be configured as R_mean. In this case, for a specific number of times from a T+1-th CSI-RS, the UE may be configured to transform the remaining elements other than R_mean of the M1 matrix to 0.

Further, the UE may generate an M3 matrix by performing quantization for the generated M2 matrix (S2025). In this case, the quantization may be as in the following examples.

For example, the UE may be configured to map a complex value which is an element of the M2 matrix in the 2 dimension region of real/imaginary to a specific value and change the mapped specific value to an index corresponding thereto. In this case, the mapping quantization degree may be adjusted according to the order of the specific reference (e.g., dominant path or signal).

As another example, the UE may be configured to calculate the magnitude and the angle of the complex value which is the element of the M2 matrix and then quantize and transform each of the calculated magnitude and angle. In this case, the mapping quantization degree may be adjusted according to the order of the specific reference (e.g., dominant path or signal). As an example, when the number of bits required for quantization of one complex value is 10, 5 bits may be equally allocated according to each of the magnitude and the angle or a bit number may be allocated at a ratio of 7:3.

Further, for the valid region, a scheme of configuring the quantization degree by a differential scheme based on a specific position may also be used. As an example, in the case of a valid region configured as 3×3, quantization bits of (2, 2) corresponding to a center position may be configured to 10 bits and a quantization bit number may be configured to decrease as far as top, bottom, left, and right regions.

As yet another example, when the value of the element has only the real value, the UE may be configured to quantize a maximum element size only with a real value.

Thereafter, the UE may transmit (or report) the generated M3 matrix value included in feedback information to the eNB (S2035). For example, the UE may quantize the value of the M3 matrix and the index and transfer the quantized M3 matrix value and index to the eNB. As another example, the UE share the position of the specific element and a specific sequence scheme which is fed back through signaling between the eNB and the UE for the value of the M3 matrix to transfer the complex value(s) to the eNB.

Thereafter, the eNB may recover the M3 matrix through a recovery operation for the feedback information transmitted from the UE and derive the channel information based thereon (S2040). As an example, the recovery operation may be an operation of mapping the index and the complex value which are fed back to a matrix constituted by C and 0 having the same size or sequentially recovering the M3 matrix by utilizing the valid region of the M3 matrix and a specific sequence scheme defined the UE and the eNB.

In such a procedure, like the above-described method, the eNB may notify, to the UE, L (i.e., the valid region configuration number of the channel) which is channel sparsity information. Alternatively, according to the scheme, the UE may report, to the eNB, L detected after the quantization operation (e.g., S1630). The UE and the eNB share an L value (that is, share a procedure of not reporting the entire elements for the channel but reporting only some valid element(s)) to predetermine a feedback index and reduce feedback overhead through the predetermined feedback index.

As mentioned above, the scheme of feeding back the channel (i.e., the information on the channel state, CSI) by using AoD, AoA, etc., based on the 2D channel modeling is described, but such a procedure may be applied even to a channel which is extended to the 3D channel modeling and considers ZoD, ZoA, etc., of course.

FIG. 21 illustrates a flowchart of an operation of a UE performing a CSI report in a wireless communication system to which a method proposed in the present disclosure is applicable. FIG. 21 is just for convenience of the description and does not limit the scope of the present disclosure.

Referring to FIG. 21, it is assumed that the UE and the eNB performs CSI feedback (i.e., CSI report) based on the methods in the first and second embodiments described above in the present disclosure.

First, the UE may receive, from the eNB, configuration information relating to a CSI report on a downlink channel. As an example, the UE may receive, from the eNB, configuration information for the CSI feedback described in Methods 1-1) and Method 2-1) described above. In this case, the corresponding configuration information may be transferred through semi-static signaling (e.g., RRC signaling). Further, as an example, the configuration information may include information related to CSI reporting setting.

Here, the configuration information may include position information and a value for at least one channel matrix element included in a specific valid region as described above.

Thereafter, the UE may receive, from the eNB, at least one CSI-RS for the CSI report (S2105). Further, the UE may calculate feedback information by at least one received CSI-RS (S2110). In this case, the UE may configure element information (e.g., spatial rotation parameter, channel valid region configuration information, quantization information, report order information, etc.) for calculating the feedback information (i.e., CSI).

In this case, the calculation of the feedback information may be performed through a step of generating a first channel matrix (e.g., the channel covariance matrix) based on the at least one CSI-RS by the UE; a step of generating a second channel matrix (e.g. the M1 matrix) by applying a preconfigured transform matrix to the first channel matrix by the UE; a step of generating a third channel matrix (e.g., the M2 matrix) by applying the specific valid region to the second channel matrix by the UE; and a step of calculating the feedback information (e.g., information including the M3 matrix) by quantizing the third channel matrix by the UE.

In particular, the UE configures, to 0, remaining elements other than elements satisfying a preconfigured threshold condition among elements of the second channel matrix to generate the third channel matrix in association with the generation of the third channel matrix.

Alternatively, when the configuration information in step S2105 further includes angular information related to the downlink channel, the UE configures, to 0, remaining elements other than specific elements configured based on the angular information among the elements of the second channel matrix to generate the third channel matrix in association with the generation of the third channel matrix. In this case, the angular information may include an angle of departure (AoD) and a support region of the AoD, and the specific elements may include a center element configured by using the support region and elements located within a predetermined range based on the center element.

Further, the preconfigured transform matrix may be configured based on the spatial rotation matrix shared by the UE and the eNB, and the feedback information may include the spatial rotation parameter related to the spatial rotation matrix.

Thereafter, the UE may report the CSI to the eNB by using the calculated feedback information (S2115).

Further, the UE may receive information on the number of at least one valid region (e.g., the L value) from the eNB.

Further, after the CSI report is performed, the UE may receive data from the eNB according to data scheduling information of the eNB, etc.

FIG. 22 illustrates a flowchart of an operation of an eNB receiving a CSI report in a wireless communication system to which a method proposed in the present disclosure is applicable. FIG. 22 is just for convenience of the description and does not limit the scope of the present disclosure.

Referring to FIG. 22, it is assumed that the UE and the eNB performs CSI feedback (i.e., CSI reporting) based on the methods in the first and second embodiments described above in the present disclosure.

First, the eNB may transmit, to the UE, configuration information relating to the CSI report on a downlink channel (S2205). As an example, the eNB may transmit, to the UE, the configuration information for the CSI feedback described in Methods 1-1) and Method 2-1) described above. In this case, the corresponding configuration information may be transferred through semi-static signaling (e.g., RRC signaling).

Here, the configuration information may include position information and a value for at least one channel matrix element included in a specific valid region as described above.

Thereafter, the base station may transmit, to the UE, at least one CSI-RS for the CSI report (S2205).

Thereafter, the eNB may receive, from the UE, the CSI report including feedback information calculated by the UE by using the at least one CSI-RS (S2210). As an example, the corresponding CSI report may include valid region information of the channel (i.e., DL channel), complex value information, quantization information, spatial rotation parameter information, and the like.

In this case, since contents related to the calculation of the feedback information are the same as those described in FIG. 21, overlapped detailed description is omitted.

Further, the eNB may transmit information on the number of at least one valid region (e.g., the L value) to the UE.

Further, the eNB that receives the CSI report may calculate data scheduling and single user (SU)/multi user (MU)-MIMO precoding by considering a channel state. The corresponding eNB may transmit, to the UE, data to which precoding is applied and an RS (e.g., DMRS or PTRS) for data decoding.

The CSI report scheme (i.e., explicit CSI feedback scheme) proposed in the present disclosure may have the following technical effect.

In the case of the legacy CSI report, a scheme of transmitting an index of a codebook having the highest similarity to the channel information calculated by the UE due to complexity and overhead problems which increase in proportion to the number of antenna ports is performed (e.g., codebook-based CSI feedback).

However, the method proposed in the present disclosure has an advantage in that since channel information is reported by extracting only a part having significant information from covariance matrix information of channel information, it is possible to configure the channel information with low overhead while enhancing accuracy of the channel information. Further, since there is no operation having special computational complexity for optimization of the spatial rotation parameter and the valid region configuration to be performed by the UE, UE implementation may also be easy.

Overview of Devices to which Present Disclosure is Applicable

FIG. 23 illustrates an example of a block diagram of a wireless communication device to which methods proposed in the present disclosure are applicable.

Referring to FIG. 23, a wireless communication system includes an eNB 2310 and multiple UEs 2320 positioned within an area of the eNB 2310.

The eNB 2310 includes a processor 2311, a memory 2312, and a radio frequency (RF) unit 2313. The processor 2311 implements a function, a process, and/or a method which are proposed in FIGS. 1 to 22 above. The layers of the wireless interface protocol may be implemented by the processor 2311. The memory 2312 is connected with the processor 2311 to store various pieces of information for driving the processor 2311. The RF unit 2313 is connected with the processor 2311 to transmit and/or receive a radio signal.

For example, the processor 2311 may transmit, to the UE, configuration information relating to the CSI report on a downlink channel by controlling the RF unit 2313 (S2205). Further, the processor 2311 may transmit, to the UE, at least one CSI-RS for the CSI report by controlling the RF unit 2313 (S2205). Further, the processor 2311 may receive, from the UE, the CSI report including feedback information calculated by the UE by using the at least one CSI-RS by controlling the RF unit 2313 (S2210). Further, in the case of the eNB that receives the CSI report, the processor 2311 may calculate data scheduling and single user (SU)/multi user (MU)-MIMO precoding by considering a channel state of the UE. The corresponding processor 2311 may transmit, to the UE, data to which precoding is applied and an RS (e.g., DMRS or PTRS) for data decoding by controlling the RF unit 2313.

The UE 2320 includes a processor 2321, a memory 2322, and an RF unit 2323.

The processor 2321 implements a function, a process, and/or a method which are proposed in FIGS. 1 to 22 above. The layers of the wireless interface protocol may be implemented by the processor 2321. The memory 2322 is connected with the processor 2321 to store various pieces of information for driving the processor 2321. The RF unit 2323 is connected with the processor 2321 to transmit and/or receive a radio signal.

For example, the processor 2321 may receive, from the eNB, configuration information relating to the CSI report on a downlink channel by controlling the RF unit 2323 (S2105). Further, the processor 2321 may receive, from the eNB, at least one CSI-RS for the CSI report by controlling the RF unit 2323 (S2105). Further, the processor 2321 may calculate feedback information by at least one received CSI-RS (S2110). Specifically, the calculation of the feedback information may be performed through a step of generating a first channel matrix (e.g., the channel covariance matrix) based on the at least one CSI-RS by the processor 2321; a step of generating a second channel matrix (e.g. the M1 matrix) by applying a preconfigured transform matrix to the first channel matrix by the processor 2321; a step of generating a third channel matrix (e.g., the M2 matrix) by applying the specific valid region to the second channel matrix by the processor 2321; and a step of calculating the feedback information (e.g., information including the M3 matrix) by quantizing the third channel matrix by the processor 2321. Thereafter, the processor 2321 may report the CSI to the eNB by using the calculated feedback information by controlling the RF unit 2323 (S2115).

The memories 2312 and 2322 may be positioned inside or outside the processors 2311 and 2321 and connected with the processors 2311 and 2321 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the eNB 2310 and/or the UE 2320 may have a single antenna or multiple antennas.

FIG. 24 illustrates a block diagram of a communication device according to an embodiment of the present disclosure.

In particular, FIG. 24 is a diagram more specifically illustrating the UE of FIG. 23 above.

Referring to FIG. 24, the UE may be configured to include a processor (or a digital signal processor (DSP) 2410, an RF module (or RF unit) 2435, a power management module 2405, an antenna 2440, a battery 2455, a display 2415, a keypad 2420, a memory 2430, a subscriber identification module (SIM) card 2425 (this component is optional), a speaker 2445, and a microphone 2450. The UE may also include a single antenna or multiple antennas.

The processor 2410 implements a function, a process, and/or a method which are proposed in FIGS. 1 to 22 above. Layers of a wireless interface protocol may be implemented by the processor 2410.

The memory 2430 is connected with the processor 2410 to store information related to an operation of the processor 2410. The memory 2430 may be positioned inside or outside the processor 2410 and connected with the processor 2410 by various well-known means.

A user inputs command information such as a telephone number or the like by, for example, pressing (or touching) a button on the keypad 2420 or by voice activation using the microphone 2450. The processor 2410 receives such command information and processes to perform appropriate functions including dialing a telephone number. Operational data may be extracted from the SIM card 2425 or the memory 2430. In addition, the processor 2410 may display command information or drive information on the display 2415 for the user to recognize and for convenience.

The RF module 2435 is connected with the processor 2410 to transmit and/or receive an RF signal. The processor 2410 transfers the command information to the RF module 2435 to initiate communication, for example, to transmit wireless signals constituting voice communication data. The RF module 2435 is constituted by a receiver and a transmitter for receiving and transmitting the wireless signals. The antenna 2440 functions to transmit and receive the wireless signals. Upon receiving the wireless signals, the RF module 2435 may transfer the signal for processing by the processor 2410 and convert the signal to a baseband. The processed signal may be transformed to audible or readable information output via the speaker 2445.

FIG. 25 is a diagram illustrating one example of an RF module of a wireless communication device to which a method proposed in the present disclosure is applicable.

Specifically, FIG. 25 illustrates an example of an RF module that may be implemented in a frequency division duplex (FDD) system.

First, in a transmission path, the processors described in FIGS. 22 and 23 process the data to be transmitted and provide an analog output signal to the transmitter 2510.

Within the transmitter 2510, the analog output signal is filtered by a low pass filter (LPF) 2511 to remove images caused by a digital-to-analog conversion (ADC) and up-converted to an RF from a baseband by an up-converter (mixer) 2512, and amplified by a variable gain amplifier (VGA) 2513 and the amplified signal is filtered by a filter 2514, additionally amplified by a power amplifier (PA) 2515, routed through a duplexer(s) 2550/an antenna switch (es) 2560, and transmitted through an antenna 2570.

In addition, in a reception path, the antenna receives signals from the outside and provides the received signals, which are routed through the antenna switch(es) 2560/duplexers 2550 and provided to a receiver 2520.

In the receiver 2520, the received signals are amplified by a low noise amplifier (LNA) 2523, filtered by a bans pass filter 2524, and down-converted from the RF to the baseband by a down-converter (mixer) 2525.

The down-converted signal is filtered by a low pass filter (LPF) 2526 and amplified by a VGA 2527 to obtain an analog input signal, which is provided to the processors described in FIGS. 23 and 23.

Further, a local oscillator (LO) generator 2540 also provides transmitted and received LO signals to the up-converter 2512 and the down-converter 2525, respectively.

In addition, a phase locked loop (PLL) 2530 receives control information from the processor to generate the transmitted and received LO signals at appropriate frequencies and provides control signals to the LO generator 2540.

Further, circuits illustrated in FIG. 25 may be arranged differently from the components illustrated in FIG. 25.

FIG. 26 is a diagram illustrating another example of an RF module of a wireless communication device to which a method proposed in the present disclosure is applicable.

Specifically, FIG. 26 illustrates an example of an RF module that may be implemented in a time division duplex (TDD) system.

A transmitter 2610 and a receiver 2620 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 15.

A signal amplified by a power amplifier (PA) 2615 of the transmitter is routed through a band select switch 2650, a band pass filter (BPF) 2660, and an antenna switch(es) 2670 and transmitted via an antenna 2680.

In addition, in a reception path, the antenna receives signals from the outside and provides the received signals, which are routed through the antenna switch(es) 2670, the band pass filter 2660, and the band select switch 2650 and provided to the receiver 2620.

The aforementioned embodiments are achieved by a combination of structural elements and features of the present disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the present disclosure may be achieved by various means, for example, hardware, firmware, software, or a combination thereof. In a hardware configuration, the methods according to the embodiments of the present disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the present disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

INDUSTRIAL AVAILABILITY

Although a scheme of transmitting and receiving channel state information in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

The invention claimed is:

1. A method for reporting, by a user equipment (UE), channel state information (CSI) in a wireless communication system, the method comprising:
receiving, from a base station, configuration information related to a CSI report on a downlink channel;
receiving, from the base station, at least one Channel State Information-Reference Signals (CSI-RS) for the CSI report;
calculating feedback information by means of the at least one CSI-RS; and
reporting the CSI to the base station by using the calculated feedback information,
wherein the configuration information includes information for at least one valid region related to the calculation of the feedback information, and
wherein the feedback information includes position information and a value for at least one channel matrix element included in a specific valid region.

2. The method of claim 1, wherein the information for the at least one valid region includes a position of a center channel matrix element of each valid region, a range of each valid range, and/or an index of each valid region.

3. The method of claim 1, wherein the calculating of the feedback information comprises:
generating a first channel matrix based on measurement for the at least one CSI-RS;
generating a second channel matrix by applying a preconfigured transform matrix to the first channel matrix;
generating a third channel matrix by applying the specific valid region to the second channel matrix; and
calculating the feedback information by quantizing the third channel matrix.

4. The method of claim 3, wherein the generating of the third channel matrix by applying the specific valid region to the second channel matrix comprises configuring, to 0, remaining elements other than elements satisfying a preconfigured threshold condition among elements of the second channel matrix.

5. The method of claim 3, wherein the configuration information further includes angular information related to the downlink channel, and
wherein the generating of the third channel matrix by applying the specific valid region to the second channel matrix comprises configuring, to 0, remaining elements other than specific elements configured based on the angular information among the elements of the second channel matrix.

6. The method of claim 5, wherein the angular information includes an angle of departure (AoD) and a support region of the AoD, and
wherein the specific elements include a center element configured by using the AoD and the support region and elements located within a predetermined range based on the center element.

7. The method of claim 3, wherein the preconfigured transform matrix is configured based on a spatial rotation matrix shared between the UE and the base station, and
wherein the feedback information includes a spatial rotation parameter related to the spatial rotation matrix.

8. The method of claim 3, wherein the first channel matrix is a channel covariance matrix by the at least one CSI-RS.

9. The method of claim 3, further comprising:
receiving, from the base station, information for the number of the at least one valid region.

10. A user equipment (UE) reporting channel state information (CSI) in a wireless communication system, the UE comprising:
a Radio Frequency (RF) unit including a transceiver for transmitting/receiving a radio signal; and
a processor functionally connected to the RF unit,
wherein the processor is configured to:
receive, from a base station, configuration information related to a CSI report on a downlink channel;
receive, from the base station, at least one CSI RS Channel State Information-Reference Signals (CSI-RS) for the CSI report;
calculate feedback information by means of the at least one CSI-RS; and
report the CSI to the base station by using the calculated feedback information, and
wherein the configuration information includes information for at least one valid region related to the calculation of the feedback information, and wherein the feedback information includes position information and a value for at least one channel matrix element included in a specific valid region.

11. The UE of claim 10, wherein the information for the at least one valid region includes a position of a center channel matrix element of each valid region, a range of each valid range, and/or an index of each valid region.

12. The UE of claim 10, wherein the processor is configured to, in association with the calculation of the feedback information,
  generate a first channel matrix based on measurement for the at least one CSI-RS;
  generate a second channel matrix by applying a preconfigured transform matrix to the first channel matrix;
  generate a third channel matrix by applying the specific valid region to the second channel matrix; and
  calculate the feedback information by quantizing the third channel matrix.

13. The UE of claim 12, wherein the processor is configured to configure, to 0, remaining elements other than elements satisfying a preconfigured threshold condition among elements of the second channel matrix in association with the generation of the third channel matrix.

14. The UE of claim 12, wherein the configuration information further includes angular information related to the downlink channel, and
wherein the processor is configured to, in association with the generation of the third channel matrix, configure, to 0, remaining elements other than specific elements configured based on the angular information among the elements of the second channel matrix.

15. A base station receiving a channel state information (CSI) report in a wireless communication system, the base station comprising:
  a Radio Frequency (RF) unit including a transceiver for transmitting/receiving a radio signal; and
  a processor functionally connected to the RF unit,
  wherein the processor is configured to:
  transmit, to a user equipment (UE), configuration information related to the CSI report on a downlink channel;
  transmit, to the UE, at least one Channel State Information-Reference Signals (CSI-RS) for the CSI report; and
  receive, from the UE, the CSI report including feedback information calculated by the UE by using the at least one CSI-RS,
  wherein the configuration information includes information for at least one valid region related to the calculation of the feedback information, and
  wherein the feedback information includes position information and a value for at least one channel matrix element included in a specific valid region.

* * * * *